United States Patent
Lundh et al.

(10) Patent No.: US 6,310,895 B1
(45) Date of Patent: Oct. 30, 2001

(54) CLOCK SELECTOR SYSTEM

(75) Inventors: Peter Lundh, Skärholmen; Mats Wilhelmsson, Hägersten; Anders Bjenne, Huddinge, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/048,582

(22) Filed: Mar. 27, 1998

Related U.S. Application Data

(63) Continuation of application No. PCT/SE96/01212, filed on Sep. 27, 1996.

(30) Foreign Application Priority Data

Sep. 29, 1995 (SE) .................................................. 9503370

(51) Int. Cl.[7] .................................................. H04J 3/06
(52) U.S. Cl. .................. 370/503; 370/516; 375/376; 375/371
(58) Field of Search .................................. 370/503, 516, 370/350, 518; 375/354, 371, 373, 374, 375, 376; 714/100, 12

(56) References Cited

U.S. PATENT DOCUMENTS

| | | |
|---|---|---|
| 4,105,900 | 8/1978 | Martin et al. . |
| 4,185,245 | 1/1980 | Fellinger et al. . |
| 4,239,982 | 12/1980 | Smith et al. . |
| 4,489,412 | 12/1984 | Duplessis et al. . |
| 4,598,257 | 7/1986 | Southard . |
| 4,672,299 | 6/1987 | Grimes et al. . |
| 4,692,932 | 9/1987 | Denhez et al. . |
| 4,698,826 | 10/1987 | Denhez et al. . |
| 4,788,670 | 11/1988 | Hofmann et al. . |
| 5,065,454 | 11/1991 | Binz et al. . |
| 5,249,206 | * 9/1993 | Appelbaum et al. ................. 375/371 |
| 5,515,403 | * 5/1996 | Sloan et al. ........................... 375/371 |
| 5,642,069 | * 6/1997 | Waite .................................... 375/357 |
| 5,724,360 | 3/1998 | Lundh et al. . |
| 5,748,569 | * 5/1998 | Teodorescu et al. ................. 375/371 |

FOREIGN PATENT DOCUMENTS

| | | |
|---|---|---|
| 303 916 | 2/1989 | (EP) . |
| 365 819 | 5/1990 | (EP) . |
| 366 326 | 5/1990 | (EP) . |
| 60-225982 | 11/1985 | (JP) . |
| 94/24793 | 10/1994 | (WO) . |

\* cited by examiner

*Primary Examiner*—Ajit Patel
(74) *Attorney, Agent, or Firm*—Burns, Doane, Swecker & Mathis, L.L.P.

(57) ABSTRACT

In a network, such as a large telecommunication switch, intended for the processing of information in different stations and for transmitting information between the stations, centrally located circuits are provided, which independently generate clock signals containing both a system clock rate and a frame synchronizing rate. These clock signals are transmitted on several, in the preferred case three, different transmission lines to a station where a multiplexor makes a selection of a clock signal as controlled by evaluation circuits containing circuits for determining errors in the received clock signals and also containing a state machine. The multiplexor selects periodically and repeatedly all the time a new clock signal in a cyclical pattern, which is accomplished by temporary, very short errors that are introduced when generating the issued clock signals. Thereby certainly all the time small phase jumps are introduced in the selected clock signal but at the same time the magnitude is reduced of a phase jump in relation to the former average phase position of the selected clock signal when possibly one of the incoming clock signals cannot be selected any more.

21 Claims, 13 Drawing Sheets

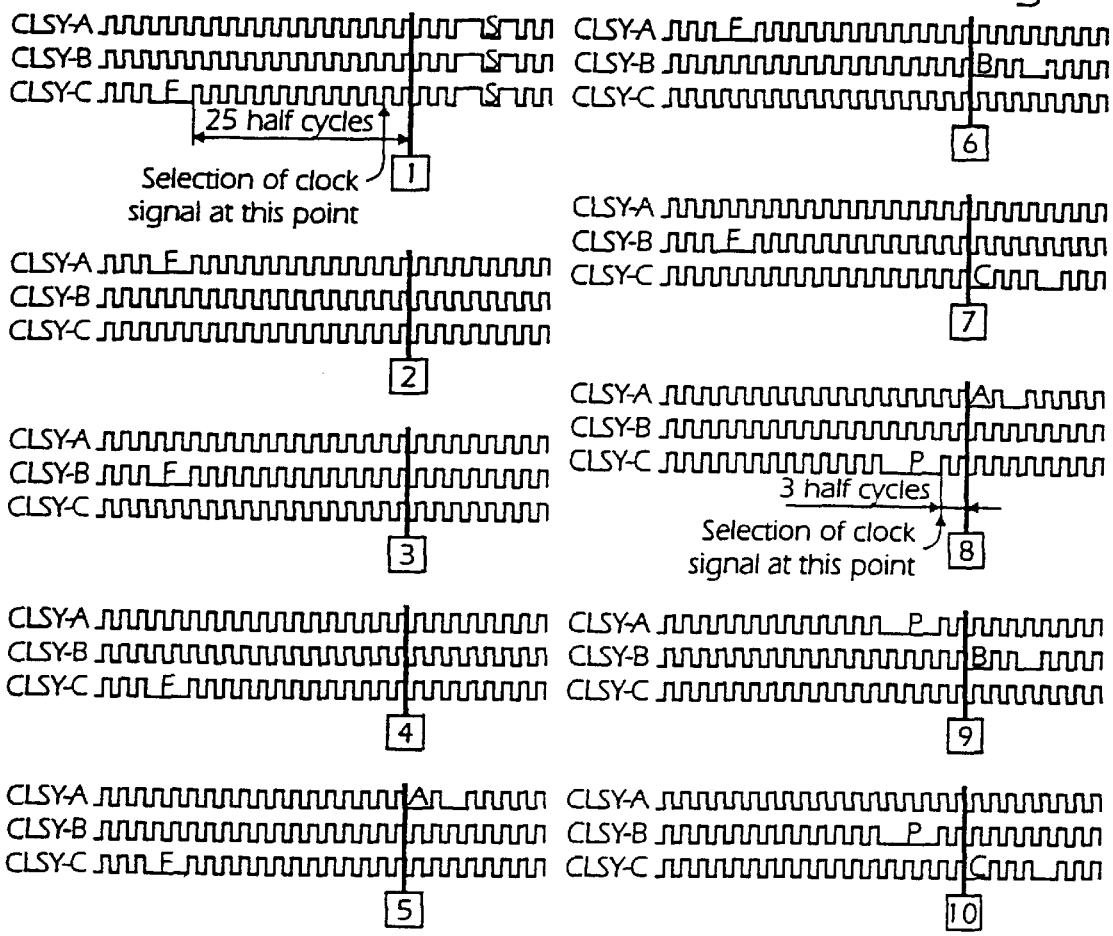
Fig. 3
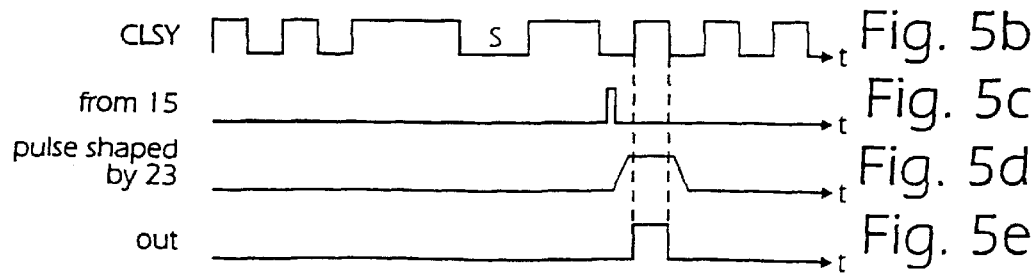
Fig. 5b
Fig. 5c
Fig. 5d
Fig. 5e

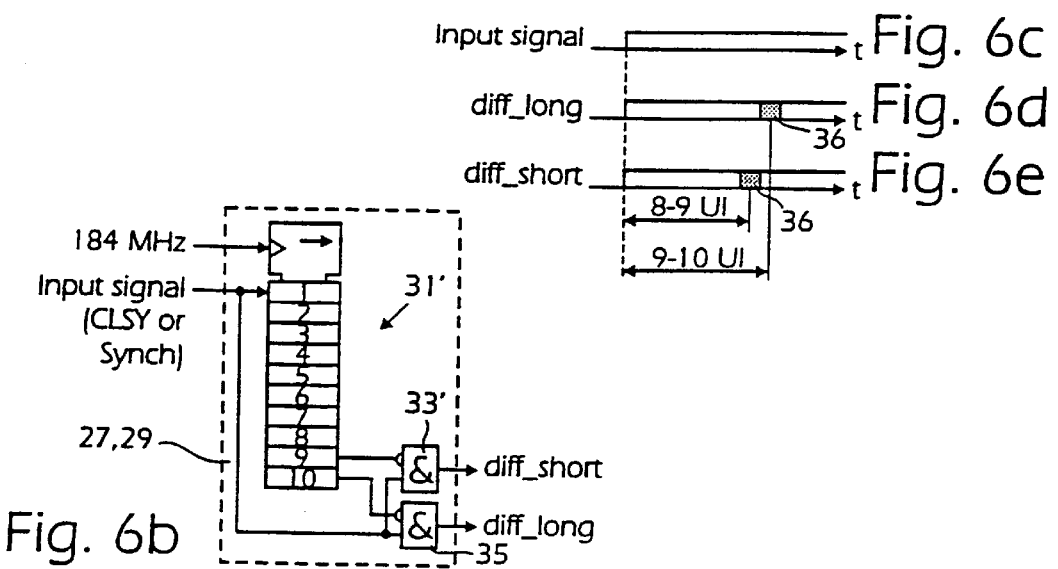
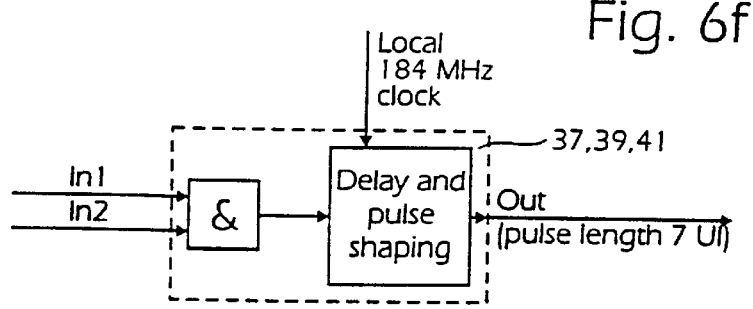
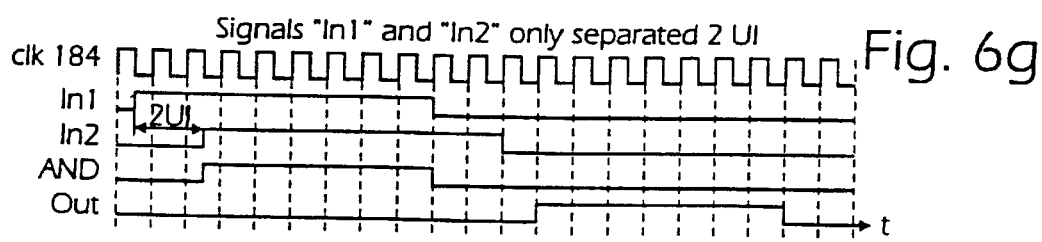
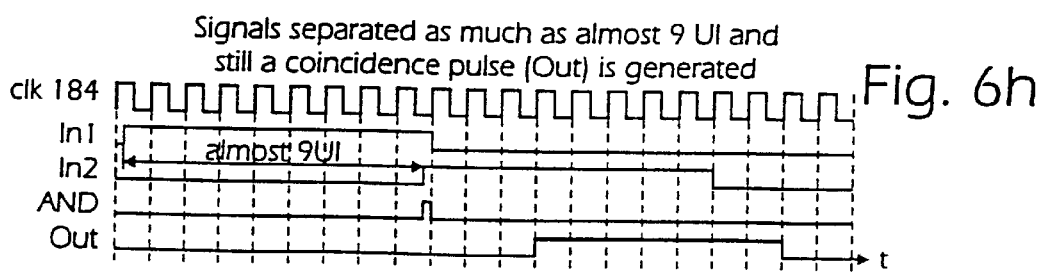
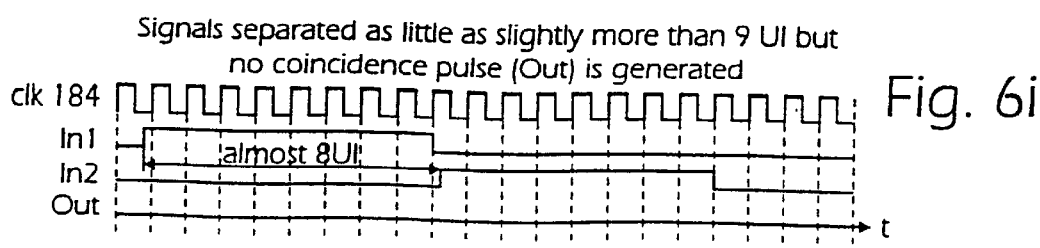

Fig. 7b

| phase error | | | frequency error | | | Available signals |
|---|---|---|---|---|---|---|
| A B | B C | C A | A | B | C | |
| colspan 7: no phase error |||||||
| 0 | 0 | 0 | 0 | 0 | 0 | ABC |
| | | | 0 | 0 | 1 | AB |
| | | | 0 | 1 | 0 | CA |
| | | | 0 | 1 | 1 | A |
| | | | 1 | 0 | 0 | BC |
| | | | 1 | 0 | 1 | B |
| | | | 1 | 1 | 0 | C |
| | | | 1 | 1 | 1 | A |
| colspan 7: one phase error |||||||
| 0 | 0 | 1 | 0 | 0 | 0 | AB |
| | | | 0 | 0 | 1 | AB |
| | | | 0 | 1 | 0 | A |
| | | | 0 | 1 | 1 | A |
| | | | 1 | 0 | 0 | B |
| | | | 1 | 0 | 1 | B |
| | | | 1 | 1 | 0 | C |
| | | | 1 | 1 | 1 | A |
| colspan 7: one phase error |||||||
| 0 | 1 | 0 | 0 | 0 | 0 | CA |
| | | | 0 | 0 | 1 | A |
| | | | 0 | 1 | 0 | CA |
| | | | 0 | 1 | 1 | A |
| | | | 1 | 0 | 0 | C |
| | | | 1 | 0 | 1 | B |
| | | | 1 | 1 | 0 | C |
| | | | 1 | 1 | 1 | A |
| colspan 7: phase error on C |||||||
| 0 | 1 | 1 | 0 | 0 | 0 | AB |
| | | | 0 | 0 | 1 | AB |
| | | | 0 | 1 | 0 | A |
| | | | 0 | 1 | 1 | A |
| | | | 1 | 0 | 0 | B |
| | | | 1 | 0 | 1 | B |
| | | | 1 | 1 | 0 | C |
| | | | 1 | 1 | 1 | A |

| phase error | | | frequency error | | | Available signals |
|---|---|---|---|---|---|---|
| A B | B C | C A | A | B | C | |
| colspan 7: one phase error |||||||
| 1 | 0 | 0 | 0 | 0 | 0 | BC |
| | | | 0 | 0 | 1 | B |
| | | | 0 | 1 | 0 | C |
| | | | 0 | 1 | 1 | A |
| | | | 1 | 0 | 0 | BC |
| | | | 1 | 0 | 1 | B |
| | | | 1 | 1 | 0 | C |
| | | | 1 | 1 | 1 | A |
| colspan 7: phase error on A |||||||
| 1 | 0 | 1 | 0 | 0 | 0 | BC |
| | | | 0 | 0 | 1 | B |
| | | | 0 | 1 | 0 | C |
| | | | 0 | 1 | 1 | A |
| | | | 1 | 0 | 0 | BC |
| | | | 1 | 0 | 1 | B |
| | | | 1 | 1 | 0 | C |
| | | | 1 | 1 | 1 | A |
| colspan 7: phase error on B |||||||
| 1 | 1 | 0 | 0 | 0 | 0 | CA |
| | | | 0 | 0 | 1 | A(B) |
| | | | 0 | 1 | 0 | CA |
| | | | 0 | 1 | 1 | A |
| | | | 1 | 0 | 0 | C |
| | | | 1 | 0 | 1 | B |
| | | | 1 | 1 | 0 | C |
| | | | 1 | 1 | 1 | A |
| colspan 7: phase error between all signals |||||||
| 1 | 1 | 1 | 0 | 0 | 0 | A |
| | | | 0 | 0 | 1 | A(B) |
| | | | 0 | 1 | 0 | A |
| | | | 0 | 1 | 1 | A |
| | | | 1 | 0 | 0 | B |
| | | | 1 | 0 | 1 | B |
| | | | 1 | 1 | 0 | C |
| | | | 1 | 1 | 1 | A |

CLOCK SELECTOR SYSTEM

This application is a continuation of International Application No. PCT/SE96/01212, which was filed on Sep. 27, 1996, which designated the United States, and which is expressly incorporated here by reference.

TECHNICAL FIELD

The present invention relates to distribution of a clock signal comprising redundancy to a user of the signal and in particular how a clock signal is selected among several available clock signals.

BACKGROUND

In the field of telephone connections and in telecommunication equipment generally, as a rule there exists a need for distribution of two clocking signals, herein called clock and synchronizing pulse rates, the latter one called "synch rate" in short, to various sub-equipments and components therein. This distribution is particularly wide in physically large connected systems, such as in the type of switches having various multiplexing stages and similar units. The clock rate has generally a high frequency and among other things defines borders for bits in the data flowing through the equipment and the synch rate has a low frequency and defines frame borders and similar things in the data signal. The number of signals transferring clock and synch information in an equipment such as a telecommunication switch station can be rather large and in the following the general expression "the clock distribution network" is used therefor. Telecommunication equipment in a magazine or cabinet, etc., has a considerable multitude of transmission components for rate distribution in the shape of cables, pins in back planes and electrical terminals, lines in back planes, etc. The space required for all such signal connections is considerable and costs money. As a rule, the number of pins in a connector is a small resource limiting the size of for example a switch.

In equipments having large requirements of their reliability the clock distribution network must of course also fulfil large reliability requirements. The reliability of the clock distribution network can be enhanced, in the conventional way, by introducing redundancy. If the clock distribution and the clock source are designed to include redundancy, i.e. that they may be duplicated or, as is supposed in the following herein, in the preferred case triplicated, a redundant and triplicated clocking structure can be maintained from clocking source to clocking receiver, however, in the receiver end one of the clocks must of course be selected for operational use by the respective equipment.

In previous systems not having redundancy, where clock rate and synch rate are to be distributed to all magazines and cabinets, as a rule two coaxial cable have been used to each receiver or user of the rates, one coaxial cable for the high frequent clock rate and one cable for the low frequency reference rate, that we call also the frame rate or the synch rate herein.

For distribution of clocking rates, where the high frequency clock is distributed separated from the low frequency synch rate, the precision must be great so that for example the pulses in the synch rate will not end up or be interpreted at the wrong one of the edges of the clock rate pulses. This poses among other things great requirements on the similarity of the lengths of the two cables used for clock and synch rate, respectively, in relation to each other and also in relation to other pairs of cables having other destinations in the system.

Distribution of a clock signal which has a very high frequency and by means of which circuits in telecommunication systems presently generally operate, in addition poses large requirements on the shielding of cables and connectors, etc. together with good grounding connections and similar things, so that interference protection and functionality can be provided and also maintained during a long time.

In for example large switches having circuits on circuit boards in magazines and cabinets there is thus a need for distributing a clock having a relatively high frequency and a rate having a lower frequency as a reference for frame structures, etc. Clock rate and synch rate can be distributed in the shape of a single, composite signal ("Composite Clock Signal"), herein called CLSY (CLock and SYnch), as described in the International Patent Application PCT/SE94/00321, which is incorporated herein by reference.

This signal comprises a clock frequency or clock rate that has a frequency considerably lower than the real system frequency at which the circuits of the system operate, i.e. is advantageously an even fraction thereof such as $1/36$ thereof, and it further comprises a synch frequency or synch rate that is modulated on top of this clock frequency and advantageously is an even fraction, such as $1/640$, thereof.

A phase-locked loop circuit, PLL, is provided with logic circuits interpreting the synch information in the composite CLSY signal and it also generates a clock signal having a frequency that is considerably higher than the clock frequency of the CLSY signal, such as for example in a similar way as above, 36 times thereof. The PLL issues the synch pulse with a precision in relation to the system clock that would have been very difficult to produce using conventional clock distribution on two separate lines.

The advantages of distributing a frequency in the shape of CLSY, that has a considerably lower frequency compared to the system clock and in addition is provided with synch information and of arranging for a PLL to generate the system clock rate together with synch rate are:

1. The signal can be distributed more easily from an EMC point of view, i.e. in regard of sensitivity to interference from the outside and in regard of its own interfering influence. The distribution medium must not have the same precision as in the case where system clock and synch rate would have been distributed separately. This implies that for instance a single optocable can be used.
2. Pins and space in connectors and back planes, etc. are saved by using the same physical signal paths for both clock rate and synch rate.
3. A very good precision can be achieved by the arrangement that the PLL generates both the system clock and the synch on the same chip and from the same signal.

Redundant clock distribution systems are disclosed in the documents discussed briefly hereinafter and also in other documents.

In the Japanese Patent Application JP-A 60-225982 clock pulse synchronization is described in a triplicated system. A harmful influence of errors is prevented by correction by means of majority decisions.

In U.S. Pat. No. 4,185,245 an arrangement is described for fault-tolerant clock signal distribution. First and second redundant clock signal sources are arranged. Clock receivers include sequential logic circuits for examining the two clock signals in order to ignore the clock signal pulse train that comes after the other one as to the phases thereof.

U.S. Pat. No. 4,489,412 discloses a network comprising supply of clock and synchronizing signals by means of clock distribution modules that perform majority voting for output signals from three oscillators.

U.S. Pat. No. 4,692,932 is related to triplicated clock distribution, each clock signal including a synchronizing signal. In the receivers R logic circuits for majority voting are included comprising three AND-gates and one NOR-gate in each receiver. These majority circuits pass only the input clock signal that has a phase position located between those of the other two clock signals. No tests are made of the quality of the received clock signals in the receivers in order to make the selection.

In U.S. Pat. No. 4,698,826 triplicated clock distribution is described. Each clock outputs a signal including a clock signal and a synchronizing signal.

U.S. Pat. No. 5,065,454 discloses a clock signal distribution arrangement having redundant clock generation. The distribution paths are duplicated for redundancy reasons.

The European Patent Application EP-A2 0 365 819 treats the problem of synchronizing the individual clocks in a multiprocessor system. A number of clock sources have each one its PLL circuit, see column 10, lines 31–58. The clocks transmit reference signals to each other which are subjected to a selection operation in each clock.

The European Patent Application EP-A2 0 366 326 treats the problem of ensuring, in a computer system in which a number of clock signals are derived from a main oscillator signal, that the clock signals appear at the right times where they are needed. It requires the introduction of a small time delay between the clock signals in order to compensate for differently long transmission paths. The solution described aims at reducing the risk of errors in the time delays of the different clock signals. A PLL circuit is used for maintaining :a phase relationship between each clock signal and a reference clock signal.

In U.S. Pat. No. 4,239,982 a fault-tolerant clock system is disclosed that is intended to produce system clock signals by means of several clock sources. Each clock source receives as input signals the clock signals generated from all other clock sources and contains receiver circuits for deriving a system clock signal from these clock sources. Each clock source generates and distributes to the other clock sources a clock signal that is locked in phase to the system clock derived from its clock receiver. The system allows the use of high clock frequencies comprising a minimum phase jitter between derived system clock signals.

In the European Patent Application EP-A2 0 303 916 four rate signals that are synchronous as to frequency and phase are generated, for providing timing for e.g. a computer system. The generation of the rate signals is made by means of four PLLs, the output signals of which are fed to four selector circuits, in which a type of majority voting is performed. The signal selected by a selector circuit is fed back to a definite one of the rate generators for controlling it. Delay circuits are introduced for adapting the phase position of the selected signals. Such delays cannot easily be introduced in the case where the clock signal contains both a clock and a synchronizing rate, the latter one having a low frequency.

In U.S. Pat. No. 4,105,900 a triplicated control system is disclosed in which three: redundant sensor signals are used, one of these signals providing precise information and the remaining two ones less precise information. A selection of signal according to a pre-programmed priority order is based on the operative state of the three sensors.

SUMMARY

It is an object of the invention to provide a redundant clock signal distribution system that when the system is regarded reduces "phase jumps" of the clock signal.

It is a further object of the invention to provide a redundant clock signal distribution system that is suited for connecting clock signals in cascade between different stations.

In an electronic system for transferring and processing information, clock signals are distributed that can be generated centrally to different subsystems. The clock signal distribution is made redundant by distributing several clock signals that are identical in principle, which when they are generated are identical at least in regard of the timing information contained in the clock signals. In a first station is selected, by means of a clock selector circuit, one of the received clock signals as that clock signal which is to be used in the station. Then the first station is made to switch the selected clock signal among the different clock signals periodically according to some scheme. In this way a time average is formed of the phase positions of the arriving clock signals, what reduces the "phase jump" that can arise in the case where some of the arriving clock signals becomes faulty and does not exist any longer among those clock signals which are repeatedly and cyclically selected.

The timing information is retrieved in the first station from the selected clock signal by means of a phase-locked loop circuit, PLL. The selection of a new clock signal can be performed with a frequency that is much higher than the limit frequency of the phase-locked loop circuit, so that jitter caused by the clock selector alternating between clock signals that present phase differences in relation to each other is reduced.

For achieving a local clock signal distribution one can let the selected clock signal also be a clock signal for other stations located nearby, i.e. the clock signal can be connected successively through several stations connected in cascade. Further, the clock selector circuits in the first station can also be made with redundancy, so that independent selections of a clock signal are made in several different planes in the first station. When these selections are made so that they are cyclically repeated between the arriving clock signals according to the above, all redundant planes will select clock signals that have the same average, in particular in regard of their phase positions. Hereby phase errors between the clock signals used in a plane in a first station will be reduced significantly when the clock signals are communicated to a cascaded station.

Redundancy of an electronic system, for instance an information processing system or a telecommunication switch, inclusive of the required clock functions can be produced by triplicating all hardware for enhancing the reliability, i.e. several identical units called planes are made to each one alone and independently perform the required functions and execute the required processes in parallel. Majority votes can be used for excluding a faulty plane.

Generally thus, a clock signal is distributed in an electronic system such as some type of network or electronic installation, for example for processing information, for executing processes in different stations or for forwarding information between stations, the clocks signal being used for control. At least two different clock sources are arranged for generating clock signals that contain substantially the same timing information. To a first subsystem the clock signals are transferred on individual lines or on different independent communication channels from each clock source to the first subsystem for supplying the clock signals as clock signals arriving to the subsystem. Selector means in the first subsystem perform a selection of a clock signal among the received clock signals.

By means of particular means or devices that include the selector means in the first subsystem it is achieved that that clock signal which is selected by the selector means in the first subsystem is constantly exchanged for a new selected clock signal. This presupposes naturally that there are at least two received clock signals among which to select, what perhaps is not always the case, see below. In the first subsystem then a time average is obtained of the phase positions of the clock signals, as regarded over a time period comprising several changes of clock signal. The changes to a new selected clock signal in the first subsystem can be made cyclically and/or in a way regular in time. In the latter case it is meant that if for instance three signals A, B, C are available a change from A to B is made after a first predetermined time period, a change from B to C after a second predetermined time period and a change from C to A after a third predetermined time period.

Similar to the construction disclosed in the International Patent Application cited above a phase-locked loop can be provided to which a line is arranged from the selector means. The phase-locked loop receives on this line the clock signal selected at each time instant and is arranged to produce therefrom a second clock signal, which for example can be used for controlling processes in a subplane in the subsystem. The means for changing to a new selected clock signal can then advantageously be arranged to perform the changes so often and the phase-locked loop can be so arranged, that the phase position of the second clock signal will be substantially free from jitter. This can be achieved by the fact that the phase-locked loop has such a time constant, that it, at a change to a new selected clock signal, only to a limited degree will have time to adapt to the phase position of the new clock signal. A phase jump can obviously be obtained at a change to a new clock signal and then the phase-locked loop will start to somewhat change the phase of the provided second signal, but a new selection and a new phase jump will occur before the phase has changed very much.

Comparison and evaluation means can be provided in the first subsystem for comparing and evaluating the received clock signals for determining those clock signals that are correct and in that case the selector means are advantageously connected to these comparison and evaluation means for performing a selection of a new clock signal only among those clock signals which have been found to be correct by the comparison and evaluation means.

For the constant change of clock signal in the first subsystem the means arranged therefor can include the clock sources and they are then arranged to provide all clock signals with artificial errors and to introduce the errors so that they are detected by the comparison and evaluation means in the first subsystem. Hereby the selector means in the first subsystem, when detecting errors, will select a new clock signal and in this way the permanent changes of clock signal can be achieved.

The comparison and evaluation means in the first subsystem can, for achieving redundancy, include at least two units working independently and in parallel and in particular an equal number of units working independently and in parallel as there are clock signals arriving to the first subsystem.

In an analogous way at least two selector units that work independently can be incorporated in the selector means in the first subsystem and in that case lines are arranged in the first subsystem for communicating the signals on all the independent lines or channels connected to each of these selector units. Each selector unit is then arranged to perform, independently of and in parallel to the other selector unit or selector units, a selection of a is clock signal among the arriving signals for producing several selected clock signals obtained in parallel.

Also the selector means in the first subsystem can advantageously comprise an equal number of selector units working independently and in parallel as there are arriving clock signals to the first subsystem.

Further, the first subsystem can be connected in cascade to a second subsystem, which then is to include selector means in substantially the same way as the first subsystem. On individual lines or different, independent transmission channels from each selector unit included in the selector means in the first subsystem these at least two clock signals selected independently in parallel by selector units are supplied as clock signals which arrive to the second subsystem or possibly are included among the clock signals which arrive to the second subsystem.

BRIEF DESCRIPTION OF THE DRAWINGS

The invention will now be described as a non-limiting exemplary embodiment with reference to the accompanying drawings in which FIG. 5b is a wave form diagram of a section of a composite clock signal containing a synch sequence, FIGS. 5c–5e are wave form diagrams of output signals from various circuits illustrating how an isolation of a synch pulse is made, FIG. 6b is a block diagram of a differentiation circuit used in the phase error detector, FIGS. 6c–6e are wave form diagrams illustrating the signal processing in the differentiation circuit, FIG. 6f is a block diagram of a coincidence detector used in the phase error detector, FIGS. 6g–i are wave form diagrams illustrating the signal processing in the coincidence detector, FIG. 7b is a truth table of a combinatorial circuit used in the clock selector control.

DETAILED DESCRIPTION

The following detailed description is based on a clocking signal called CLSY (CLock and SYnch signal), see the discussion above and the International Patent Application PCT/SE94/00321 mentioned above.

The CLSY signal is a composite clock signal that is composed of a clock signal "clock" which hereinafter is assumed to be chosen to 5.12 MHz and is a pulse signal, typically a square wave signal, having a frequency that is here called the base frequency or the base band frequency, and a synchronizing signal "synch" having a frequency that hereinafter is assumed to be chosen to 8 kHz. The clock frequency that is supposed to be used in the system of the different "useful components" thereof is 184.32 MHz and is also called the frequency of the system bit clock or the frequency of the system clock, but in order to be able to distribute more easily clock rates in the system the clock rate is distributed in this way having a lower frequency, the base band frequency in order to be, on the receiver side, i.e. in each unit that needs a system rate, multiplied by a factor of 36 in a PLL, a phase-locked loop circuit, in order to obtain the desired system clock of 184.32 MHz. The PLL also decodes the synchronizing signal that is included in the CLSY signal. The PLL has also the quality of being insensitive to the cases where single pulses in the input signal are omitted or where there are single spikes in the input signal.

Inside the CLSY signals codes for maintenance testing are also provided. These codes or patterns supply information in regard of the plane in which a considered CLSY signal is generated and further, they emulate certain errors for maintenance testing the hardware.

There are several advantages of the CLSY signal, as has been indicated above: phase differences between clock rate and synch rate are reduced, the number of physical signal conductors is reduced and "phase jumps" will have magnitudes of at most ¼ of the period of the synch and clock rate respectively, i.e. of the periods corresponding to the frequencies of 8 kHz and 5.12 MHz respectively.

Figure 1:
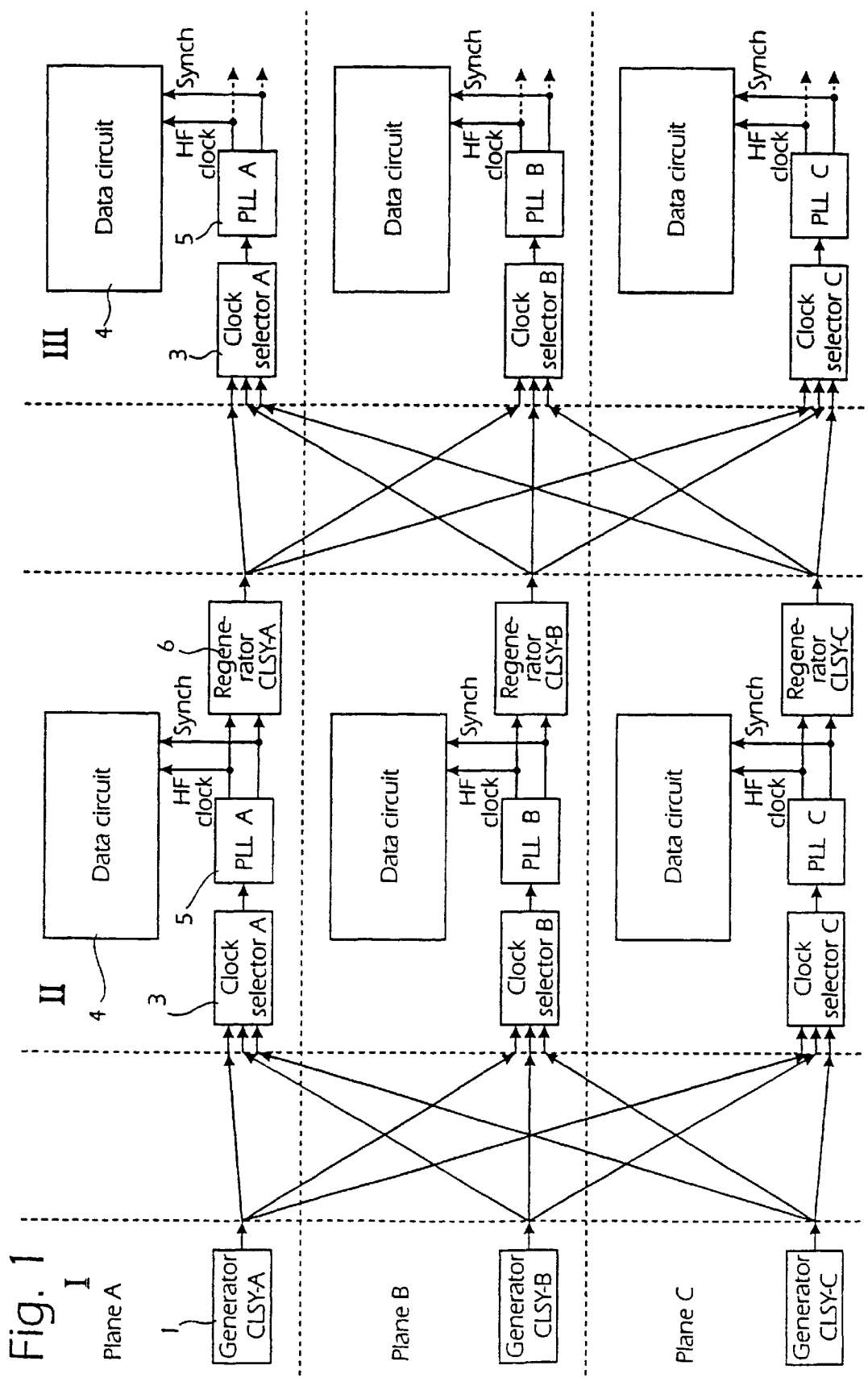
FIG. 1 is a block diagram of a clock distribution system.

The logical architecture of the generation, distribution and termination of the clock and synch signal will first be described at a general level. In FIG. 1 it is shown in principle, how three generators 1 create the composite clock signals, the CLSY signals, i.e. three equivalent composite signals here called CLSY-A, CLSY-B, CLSY-C, that contain both a clock rate and a synch rate. These composite clock signals are distributed from each generator 1 to each one of three clock selectors 3 that terminate the triplicated distribution. In each such clock selector 3 an independent choice is made, independent of the other two clock selector, of the "best" clock signal by evaluating the different received clock signals and comparisons thereof. Thereafter the selected CLSY signal passes from each clock selector 3 to a following phase-locked loop circuit 5, PLL, in order to be separated there in its components, the clock rate and the synch rate, respectively, and for generating a system bit clock. The system bit clock and the synch rate are used in each plane by various electronic circuits that are schematically illustrated by the triplicated data circuit 4 in FIG. 1.

Each one of the oscillators 1 is constructed so that it creates a composite clock signal, a CLSY signal, containing pulses or pulse patterns for definition of clock rate and synch rate and further also sequences of pulses or changed or modified pulses that imitate errors, for maintenance testing following clock selectors 3, and also, hidden in the pattern of pulses for clock rate and synch rate, by the method that some pulses have been changed, an identity code comprising information on the plane in which the considered CLSY signal has been generated, i.e. whether it has been generated by the oscillator in plane A, B or C. "Artificial errors" in the CLSY signal are created by the method that a CLSY generator 1 introduces the errors in the composite clock signal already from the beginning, so that the errors constitute a natural part of the CLSY signal. By this method it will not be possible to remove or add artificial errors on command.

The task for a clock selector 3 is to autonomously select a working composite clock signal among the three arriving clock signals CLSY-A, CLSY-B, CLSY-C. Criteria of the fact that a CLSY signal is to be considered as correct is that its frequency is correct and that its phase position in relation to the two other CLSY signals is to be located within certain limits. The clock selector 3 thus makes an autonomous judgement of the frequency and the phase position in relation to each other of the arriving clock signals and selects according to an algorithm one of the input signals, which is communicated to the output terminal of the clock selector 3 through a multiplexer in the clock selector 3. The clock selector is thus maintenance tested by means of artificial errors which are always included in the CLSY signals. Further, the artificial errors are entered so that the clock selector 3 will run through all accepted clock signals and in particular so that it periodically and in a pattern that is regular in time changes cyclically between them. In this way it is constantly verified that it is possible for a clock selector 3 to actually select anyone of all accepted composite clock signals. By using this method no signals are to be provided that are outside the functional clock distribution, but the signals needed for the maintenance testing are always incorporated as a part of the functional clock signal.

The function of a PLL 5 is, as has been mentioned above, to separate the arriving CLSY signal in its components, signals for clock and synch rate respectively, to multiply the extracted clock frequency to the system bit frequency of 184.32 MHz, to filter out ID-codes and emulated, i.e. intentionally introduced, error patterns, to convert abrupt phase jumps to slow phase drifts and to filter jitter that can exist in the input signal to the PLL 5.

In order to obtain a high MTBSF (Mean Time Between System Failure) for the circuits and connections in the system, it is important that as many as possible of the possible errors that can arise in the hardware can be safely detected. It is also important that a possibility exists of localizing an error as well as it is important that no errors are propagated through the system and thereby give the system worse characteristics.

In order to obtain this, it is naturally important that the maintenance functions are as reliable as possible. Further, if a hardware error would appear in the very maintenance functions, this should also be possible to detect wherever the error has arisen. Similarly, the design of the system should not be such that an error actually has arisen in some part that influences the main task of the system and that the maintenance functions are not capable of detecting this error owing to some error in the maintenance functions or some other error or owing to an imperfect construction.

To use a single static hardware signal, that informs on alarm state, thus "OK" or "not OK", must be considered as unreliable, as has been mentioned above. A hardware error can have arisen in the hardware communicating the signal, so that the information of the signal is erroneous. It can indicate "error" even if it is "OK", or indicate "OK" in spite of being error In the design of maintenance systems for clock functions the principle is used that at least two different signals in the hardware are to be supervised by software and the criterion of the fact that the system is to be judged correct should be that there must exist a certain relation between these hardware signals and further, that the hardware signals should not be static, but that they instead should be constituted by either counters or flags, which change according to a predetermined pattern, for example such as that a certain flag is set at some occasion and then is reset at another occasion. The software should then require that the expected dynamics, i.e. the serial order in which the flag is set and reset respectively, exists all the time and that otherwise an alarm signal is generated in the software.

The function of a clock selector 3 is according to the discussion above mainly both to select away, at each time instance, a badly working clock and to select among the remaining correct clock signals a working clock signal CLSY-A, CLSY-B or CLSY-C. In order to check whether a clock selector 3 is working, that clock signal which at a considered time instant is selected by the considered clock selector 3, is deteriorated by the permanently and intentionally introduced errors, and supervising functions check that the clock selector 3 then is capable of selecting another composite clock signal.

The clock signals, the CLSY signals, are therefor, as has been indicated above, made to contain, already from the start, pulse sequences which imitate defective clock signals. The CLSY signals are generated in the construction blocks that are called CLSY generators 1 in FIG. 1. The artificial errors which are found in a CLSY signal are further entered so that they correspond to criteria that define the clock qualities which the clock selector is to accept or not accept, respectively.

From a clock selector 3 the selected CLSY signal is provided and in order to be able to decide if it is that CLSY signal that the system should select or think that it has selected, the CLSY signals have, according to the discussion above, also been provided with identity codes, ID-codes, during the generation of the signal. The CLSY signal that is generated in the A plane, is thus called CLSY-A and is provided with an identity code A, indicating that the CLSY signal has its origin in the A plane. In the corresponding way the CLSY signal from the B plane is provided with an ID-B code and the CLSY signal from the C plane with a code for C. By monitoring the CLSY signal provided from a clock selector 3 superior functions in the system can determine the identity of the CLSY signal that has been selected.

Figure 2:
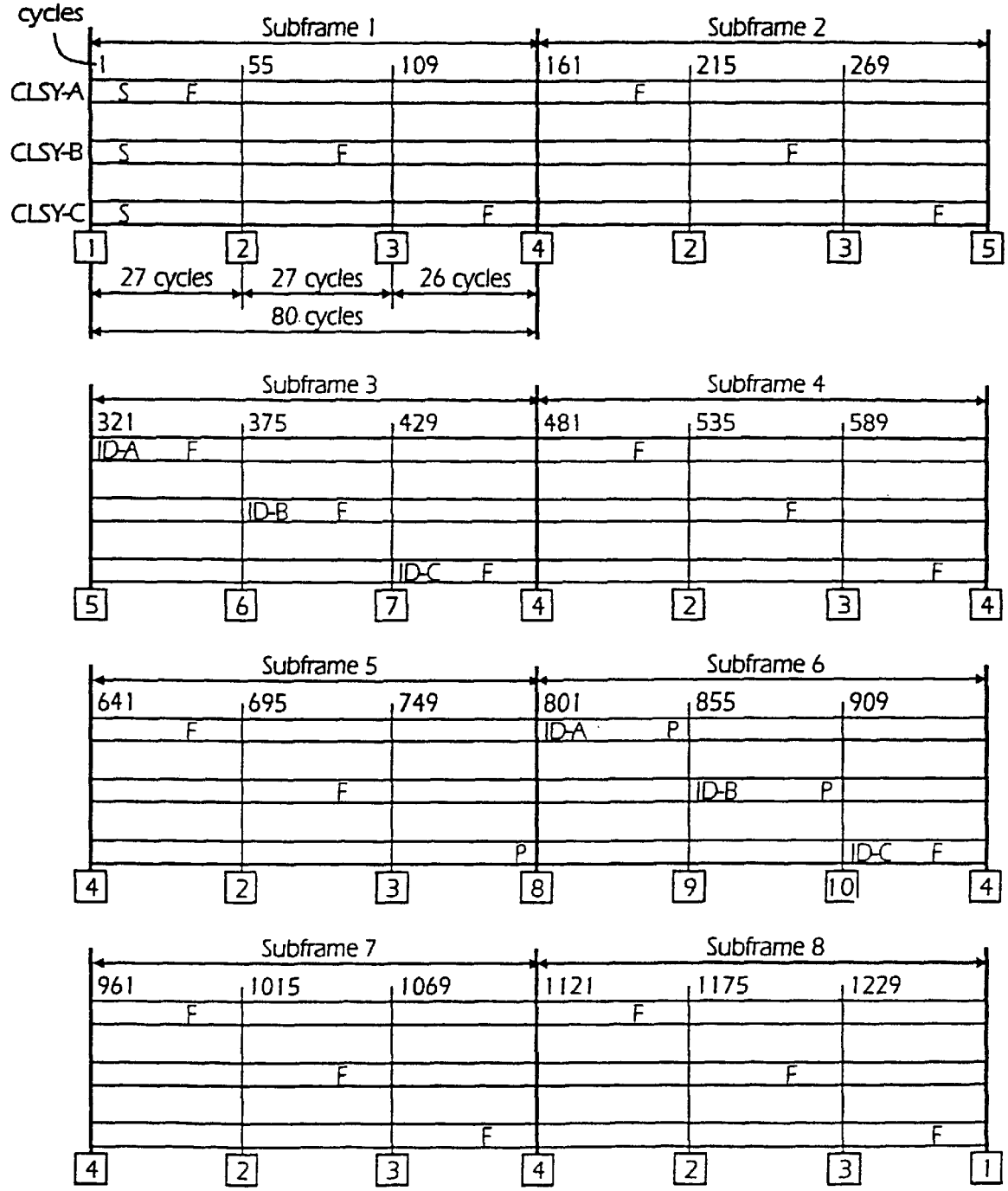
FIG. 2 is a diagram illustrating the structure of a frame in a clock signal, FIG. 3 are wave form diagrams as functions of time that illustrate various subsequences of the clock signal frame.

A CLSY signal is divided into frames which each one has a length of 125 microseconds, i.e. the frames are repeated with the frequency 8 kHz which is the same as the synch rate, is and they comprise 640 cycles or periods of the clock rate signal of 5.12 MHz. Further each pulse or period of the clock rate signal can be considered as two halfperiods, where a transition, positive or negative, can occur, and using this way of looking then 1280 data bits exist in each CLSY frame. These bits are numbered from 1 up to 1280 as is shown in FIG. 2. A CLSY frame is divided into 8 subframes and each subframe is divided into three subsections, the first and second subsections of which each one has a length of 54 bits and the third subsection of which has a length of 52 bits.

In the beginning of each CLSY frame a pattern is provided for frame recognition and this pattern is called a synchronization pattern or synchronization sequence that indicates a synch pulse. It is this pattern that a PLL 5 recognizes and each time that this pattern is recognized by a PLL 5, the PLL 5 generates a corresponding synchronization pulse. This synchronization pattern increments, for each time that it appears on the output of the multiplexer of the clock selector, a counter for synchronization patterns as will be described hereinafter.

In each CLSY frame two ID-codes are arranged, naturally denoting the same plane. In the CLSY signal generated in the A plane two ID-codes for A are provided. The corresponding condition applies to CLSY signals generated in the B and C planes.

In FIG. 3 subsequences of the CLSY frame that are schematically illustrated in FIG. 2 are shown as wave form diagrams. The numbers within squares in these figures correspond to each other. In the CLSY signals particular bit sequences or pulse sections of the pulses in the base band frequency are arranged that indicate synchronization pulses S for each frame, frequency reject sequences F, phase reject frequencies P and identity codes ID-A, ID-B, ID-C. Each frame thus starts with a synchronization sequence S. Within each subsection of a frame there is an intentionally introduced error sequence F or P for simulating frequency errors and phase errors respectively in a single one of the three clock signals. The distance from a frequency reject sequence F to the following border between two subsections in the frame is always constant. The distance from a phase reject sequence to the most nearly located, following border between subsections is also constant but has a value which is different from the distance that applies to the frequency reject sequences and which in particular is less than it. The ID-codes ID-A, ID-B, ID-C always follow directly after a border between two subsections, i.e. they arrive first or early in a subsection, before the error sequence therein. The error sequences F or P always follow in the later part of a sub-section, so that in a subsection there is room for both an identity code and an intentionally entered error sequence.

The frequency reject sequences F consist of the device that two pulses in the bass frequency have been omitted and that during them a smooth low voltage level exists and in the same way the phase reject sequences P consist of the device that three pulses in the base band frequency have been omitted, i.e. they are one pulse longer. The phase reject sequences P occur in each clock rate frame only once in each clock signal, i.e. in only one subsection. In other subsections there is a frequency reject sequence F in only one of the composite, clock signals. Identity code sequences ID-A, ID-B, ID-C occur twice in each frame and each individual clock signal. They consist of the device that two pulses are omitted having a different number of remaining pulses therebetween, in particular one, two or three remaining pulses for the identity code sequences ID-A, ID-B and ID-C respectively.

Using the preferred arrangement, which will be described in greater detail hereinafter, a clock signal selector 3 that works correctly will select CLSY-A as an output signal during the first subsection in each subframe, it will select CLSY-B during the second subsection in each subframe and CLSY-C during the third subsection in each subframe. A new selection of clock signal will then thus be performed at each vertical, thin or thick, line in FIG. 2. There will always be time to perform this, before the next intentionally entered error sequence is detected and also before encountering an ID-code.

A clock selector 3 comprises, as has been mentioned above, a multiplexer and it has three input terminals and one output terminal and one address input terminal controlling the multiplexer, see the detailed description hereinafter. The control address is generated autonomously in control logic circuits in the clock selector that sense quality, phase position and frequency of the three arriving CLSY signals and from these measurements and certain other criteria, as given by an internal state machine, determine the clock that is to be selected and is to be provided from the selector. On the output side of the multiplexer a device is provided recording ID-codes. Alternatively the ID-code of the selected composite clock signal can be obtained directly from the control logic circuits. For each ID-code A that is detected on the output terminal of the multiplexer, a counter for ID-A pulses is incremented. The corresponding counters are provided for ID-B and ID-C. In addition to counters for ID-codes also, as has been mentioned above, a counter is provided for the number of detected synch patterns, where each synch pattern defines a clocking pulse for the synchronization rate.

Also on the input side of the multiplexer an arrangement is provided comprising ID-code counters that will be described hereinafter. On the input of the multiplexer where the clock signal CLSY-A from the generator A is expected to arrive, a device is provided sensing ID-A pulses and for each pulse a counter is stepped. At the input terminals of the other clock signals CLSY-B and CLSY-C of the clock selector or multiplexer corresponding counters for, ID-B pulses and ID-C pulses are provided.

The principle of verifying that the clock selector works is that the software reads the number of counted ID-codes and checks that the counted numbers of ID-pulses A, B and C on the input side of the multiplexer agree with the number of counted ID-pulses and synch pulses on the output side of the multiplexer. In order that the counted pulses are to correspond to one and the same period, all counters are reset simultaneously at a certain time and before the count values are read, the incrementing thereof is simultaneously stopped.

Software is arranged taking care of the maintenance functions. This software reads at certain intervals the counter values. After all counters have been read, they are reset and before they are read, their counter values are frozen simultaneously according to the discussion above so that they are not updated any further. Thereby all counter values will correspond to one and the same time period.

In order to explain the number of counted pulses or, more exactly, the relation which its to exist between different counter values that have been recorded by the counters in a clock selector 3, for a correct function, it will first be described in greater detail the way in which the CLSY signals are constructed. It should be observed that the PLL 5 that is provided after a clock selector 3 is insensitive to both ID-codes and artificial error sequences, emulated errors, by the fact that it can only change relatively slowly. It can also be observed, that the triplicated distribution of clock signals in to a clock selector after the clock selector is no longer triplicated. Neither is the PLL 5 triplicated in the respective plane, but in contrast there is a PLL 5 in each plane, so in this way also the PLL is triplicated. If any of the PLLs breaks down, it is observed by the fact that the whole plane goes faulty. It is not necessary to supply maintenance checks of a PLL 5, since an error in a PLL 5 is visible. In the system erroneous PLLs 5 cannot exist without being observed. An error in a clock selector 3 would in contrast exist if special maintenance functions for the detection thereof were not provided. For example it could be so that the clock selectors in the A plane and the B plane owing to some fault cannot select any other clock than for example A. The system will then work well as long as the clock A exists and is correct, although the redundancy does not work in the intended way. Then it is enough that an error arises in the CLSY generator 1 in the A plane in order that the whole system will stop to work. It is thus important to provide reliable maintenance functions in the clock selector 3 in order to ensure that no errors exist there.

The CLSY signals and the functions in the clock selector 3 are adapted to each other in order that cycling between clock signals and maintenance testing will be provided. In particular the clock selectors 3 are designed for excluding signals having phase errors and/or frequency errors. Knowing how the detectors for the phase and/or frequency errors are made, particular patterns can be entered in the CLSY signal which make that the detectors in the clock selector for phase and frequency errors, respectively, are used all the time.

The phase monitoring is made in the following way: The phase position between each pair of CLSY signals, i.e. between A and B, between B and C and between C and A, is checked by the method that the edges are not allowed to be separated in phase (="skewed") by more than a certain number of nanoseconds, "the phase acceptance window", which for example can be set to about 44 to 49 nanoseconds, what will be discussed in greater detail hereinafter. The positive edges in each CLSY signal are converted to a pulse having a definite duration that is equal to the width of the phase acceptance window. These pulses are called differentiation pulses. The differentiation pulses from the two planes that are to be compared in regard of phase, are connected to an AND-gate. If the two CLSY signals are separated in phase by more than the width of the differentiation pulses, there will be no logical one as output signal from the AND-gate. However, if the signals are in phase or are not separated by more than the width of the phase acceptance window, a logically true signal will be generated as output signal from the AND-gate, since both of the differentiation pulses are logically true during a time period. The signal generated in that way as output signal from the AND-gate is called a coincidence pulse. Knowing that in a normally working system the CLSY signals are not separated as to their phases by more than the width of the phase acceptance window, i.e. that all differentiation pulses will result in a corresponding coincidence pulse, and the differentiation pulses, that are generated from the positive edges in the respective CLSY signal, have a periodicity of at most about 600 nanoseconds, the result will be that the time period between coincidence pulses will agree with the time period between simultaneous positive transitions or transitions, i.e. at the longest about 600 nanoseconds. The time period between the coincidence pulses is monitored and constitutes a measure whether the two CLSY signals are in phase with each other: In the case where the time period is below 650 nanoseconds, the signals are said to be in phase with each other. In the case where the time period is above 650 nanoseconds, at least two differentiation pulses have not arrived sufficiently simultaneously (not with a sufficient overlap), are thus separated by more than the width of the phase acceptance window and are thus not in phase with each other.

In order to verify whether the phase supervision works, a suitable number of positive transitions in the CLSY signal can be removed. Then will, in the case where the phase monitoring logical circuits work, a corresponding phase alarm be generated and a change of clock is made in the clock selector 3.

If a phase error exists, a real or "genuine" one or one produced by manipulating the CLSY signal, for example in CLSY-A, the phase monitoring logic circuits will observe a phase error of the clock signal A and the clock signal B in relation to each other and of the clock signals C and A in relation to each, but not of the clock signals B and C in relation to each other. By means of decoding the information from the phase monitoring logical circuits in a combinatorial way a conclusion can be made in regard of the plane that has a phase error, in the case where a plane would have one.

When and if a plane, that is selected by a clock selector 3, has been noticed to be faulty, a selection of another plane is to be made. Which one of the two remaining working planes that is to be selected is defined in a state machine in the clock selector 3, see below. If the clock signal A is selected and in the case where A becomes faulty, clock signal B is selected.

If clock signal B is selected and B stops working correctly, clock signal C is selected. If the composite clock signal C is selected and stops working, clock signal A is selected. If a clock signal is selected and any of the other clocks stops working, no reselection is made. In the case where a considered clock signal has been selected owing to that another clock signal stopped working and in the case where this clock signal then again starts working, the clock selector 3 remains with the latest selected clock signal and does not return. For example, if thus clock signal A is selected and stops working correctly, clock signal B is selected. If then the clock signal A becomes correct again, the clock selector 3 still has the clock signal B.

By removing a certain number of positive transitions (=edges) from a selected CLSY signal, thus a clock selector 3 will judge that this signal is faulty and deselect this signal and instead select the clock signal that is in turn according to the state machine. The intentional sequences in the CLSY signals that trigger the error detectors and thus emulate various faults are here called reject codes.

By entering such reject codes in the CLSY signals at different positions a clock selector 3 can be made to cyclically select the different clock signals CLSY-A, CLSY-B and CLSY-C in a circulating serial order. By entering ID-codes in the CLSY signal to which the change is made, at predetermined positions in the CLSY signal, which comes immediately after the, time when a change is to be made, the system can verify, by reading the counters for ID-codes, that all error detectors work. If anyone of the error detectors does not work, the change will not be made to the CLSY signal being the next one, so that the corresponding ID-code will not be recorded by the intended counter. On the other hand, if an error detector has broken down in such a way that it generates an alarm all the time, also then an incorrect number of ID-pulses will be counted. A diagnosis of the cause of the error can be made by a suitably designed decoding table, to which the inputs are constituted of the number of recorded ID-codes.

In addition to phase errors also frequency errors are monitored. The frequency of the three arriving CLSY signals is supervised by comparing to a locally generated chronometer rate. There is thus no relative comparison between the signals, such as is the case for the phase monitoring, but a check of the frequency of each incoming signal in relation to a chronometer rate.

In each clock selector 3 a frequency monitoring unit is provided for each arriving CLSY signal and this monitoring unit can provide a corresponding frequency alarm for each CLSY signal. The frequency monitoring is made in the following way: if the CLSY signal has a too long period, an alarm is generated. The alarm limit can be set to for example 400 nanoseconds.

In order to verify that the frequency monitoring works, a suitable number of cycles in a CLSY signal can be replaced by a constant (voltage) level, so that the criterion "time period longer than 400 nanoseconds" is fulfilled. Such a sequence emulating a frequency error is called a frequency reject code and a sequence emulating phase errors being is called a phase reject code.

The information in regard of frequency errors in the clock selector 3 is put together with the information in regard of phase errors in a combinatorial table, see FIG. 7b. An output signal from the table indicates those CLSY signals which are defective and those which are correct. This information together with the state machine for clock selection decides the clock to be selected. Output signals from the state machine are communicated to the address input terminal of the multiplexer and control in that way the clock to be chosen.

By entering, as has been described above, frequency reject codes in the CLSY signals at various positions a clock selector 3 can be made to cyclically select CLSY-A, CLSY-B and CLSY-C in a circulating serial order, where thus a change is always made at a transition to the next subsection of the selected clock signal. By arranging two identity codes in each frame, the number of encountered codes can be counted in the selected clock signal and thereby it can be checked that the error detectors work. By entering an ID-code in the CLSY signal, to which a change is made after detecting a phase error sequence, so that it can be sensed immediately after the change has been made in this case, the system can verify, by reading the counters for ID-codes, that all phase detectors work. In the case where a phase error detector does not work, a change will not be made from a selected clock signal, when an intentionally introduced phase error exists in the clock signal. This results in that the ID-code of the subsequent signal in the cyclical sequence ABCABCA . . . will not be recorded and counted. The corresponding condition applies to frequency errors. Normally, as an average for each frame ID-codes will be counted twice for each clock signal CLSY-A, CLSY-B, CLSY-C.

The frequency reject pulse is about 500 nanoseconds long. The phase reject pulse is about 700 nanoseconds long. The frequency reject pulses do not trigger the phase detectors but the phase reject pulses trigger the frequency detectors. In order that it should be meaningful to read the ID-codes after a phase reject pulse it must be guaranteed that the phase detectors and not the frequency detectors have caused the change of clock.

The method therefor is to arrange that a clock change caused by the phase detectors is made much more rapidly (=earlier) than a change caused by the frequency detectors, and that the ID-code associated with the phase reject pulse or phase reject code is placed directly after the time of the phase reject pulse. The ID-code is provided in that CLSY signal to which the change is made, what appears from FIG. 2, see those sections which are denoted by FIGS. 8, 9 and 10 within squares.

If a phase reject pulse is entered in CLSY-A, the clock selector 3 will, as soon as the phase detectors therein have detected the (artificial) phase error, select clock signal B. If now clock signal B has been chosen and an ID-B exists in CLSY-B, then ID-B will be visible on the output terminal of the multiplexer in the clock selector and there it can be counted.

If a phase reject pulse is entered in CLSY-A, but the phase detectors are faulty, the frequency detectors in the clock selector 3 will cause, but not until after a delay time, a change of clock from clock signal A to clock signal B. Now if clock signal B has been selected and an ID-B exists in CLSY-B, though this ID-B is placed immediately in time after the phase reject pulse, ID-B will not be visible on the output terminal of the multiplexer, since the change to CLSY-B is delayed owing to that it has been caused by the frequency detectors. Suitable delays can be chosen based on the detailed wave form diagrams of FIG. 3, see in particular the diagrams at the squares containing 1 and 8. A selection of clock signal is made at the border between to subsections, for example at a time corresponding to one or two pulses from such a border. This means that the selection is made almost immediately after a phase error P by considering the clock signals which have been without errors during the most proximate time period, in particular within the considered subsection. If the delay mentioned above when detecting a frequency error is at least, say 4 to 5 periods of the clock rate, an intentionally introduced phase error, that has only been detected by frequency detectors, will not be included in the selection of a new clock signal at the subsection border but a consideration thereof is not made until at the next border.

In this way it is thus possible to make a maintenance test of the phase detectors only, by means of the phase reject pulses, without having the test damaged by interference of the frequency detectors, and it is also possible to make a maintenance test of the frequency detectors only, by means of the frequency reject pulses, without causing that the phase is detectors provide alarm signals because of that reason.

In each CLSY frame one phase reject pulse and seven frequency reject pulses are arranged. It means that the clock selector runs through the sequence A-B-C eight times within one CLSY frame, i.e. that the sequence A-B-C is run through with a frequency of 64 kHz. An advantage of this rather high frequency is that if the three clock signals arriving to the clock selector are a little out of phase in relation to each other, owing to component spreads, the CLSY signal phase step modulated immediately after the clock selector will be smoothed or evened by the PLL 5 that has a relatively low limit frequency. The PLL 5 reduces the phase jitter that is introduced by the maintenance tests comprising the associated clock selector 3 changes all the time the selected clock signal with such a high frequency.

The clock system also allows that units are connected in cascade. In the first stage I the clock signals are always generated by generators 1, see FIG. 1. In the next stage II, for each plane, a clock signal is selected by means of clock selectors 3 among the clock signals generated by the sources 1 and therefrom is produced or extracted, respectively, the high frequency clock signal or system bit clock and the synch signal by means of PLLs 5. These two retrieved simple clock signals are delivered to clock regenerators 6 that can be located in this stage II, or possibly in the next following stage III. In these regenerators 6 again composite clock signals are formed by introducing synch patterns, identity codes, frequency and phase reject sequences. These new clock signals are then communicated to clock selectors in the next stage III, etc. An advantage that is valuable particularly in cascading several clock systems is that in each plane in each stage an average formation of the phase positions of the clock signals is made from the planes in the previous stage by means of the clock selector 3 and the PLL 5, i.e. that in each plane in a stage an average formation is made of the clock signals from the same three planes in a previous stage, resulting in that possible phase differences for the clock signals of the planes in the previous stage are evened out or smoothed.

Figure 4:
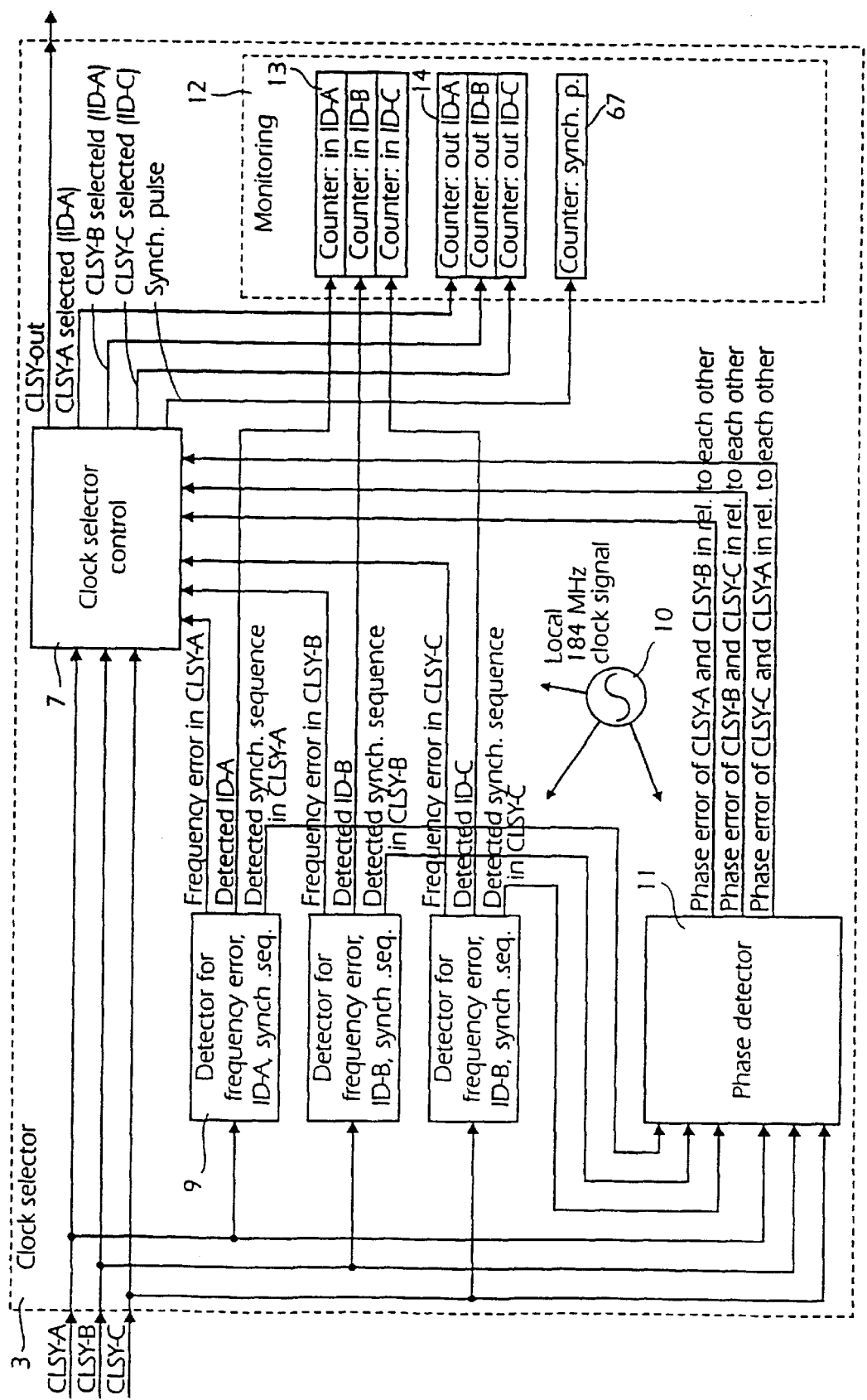
FIG. 4 is a block diagram of a clock selector unit.

The construction of a clock selector 3 is illustrated in the block diagram of FIG. 4. The central portion thereof is a clock selector controller unit 7 that mainly performs logical choices based on different signals from detectors and comprises a multiplexer. The different composite clock signals CLSY-A, CLSY-B and CLSY-C arrive to a clock selector unit 3. Such an arriving signal is communicated to a detector 9 that makes a determination whether the high frequency of the base band signal is correct in the arriving composite clock signal. Further, the detector 9 extracts identity codes which exist in the arriving signal and provides pulses at each time when such an identity code is encountered. Further, also such a detector 9 provides an output pulse at each time that a sequence S of pulses in the input signal which indicates the synchronization, is found.

Further, in a clock selector unit 3 a phase detector 11 is provided that determines both whether the phase of the pulses having the higher frequency, the base band frequency, agrees with each other in the different signals and whether the phase of the synch patterns agrees and that provides signals when agreement is not detected. The clock selector 3 comprises also a monitor control 12 that comprises suitable program routines or corresponding devices, for example state machines, and also counters 13 for different detected pulse sequences in the arriving composite clock signals and counters 14 for encountered identity codes in the selected composite clock signal. Various circuits in the clock selector 3 also use local clock signals, in particular a clock signal having a frequency of 184 MHz, as illustrated by the clock circuit 10.

Figure 5A:
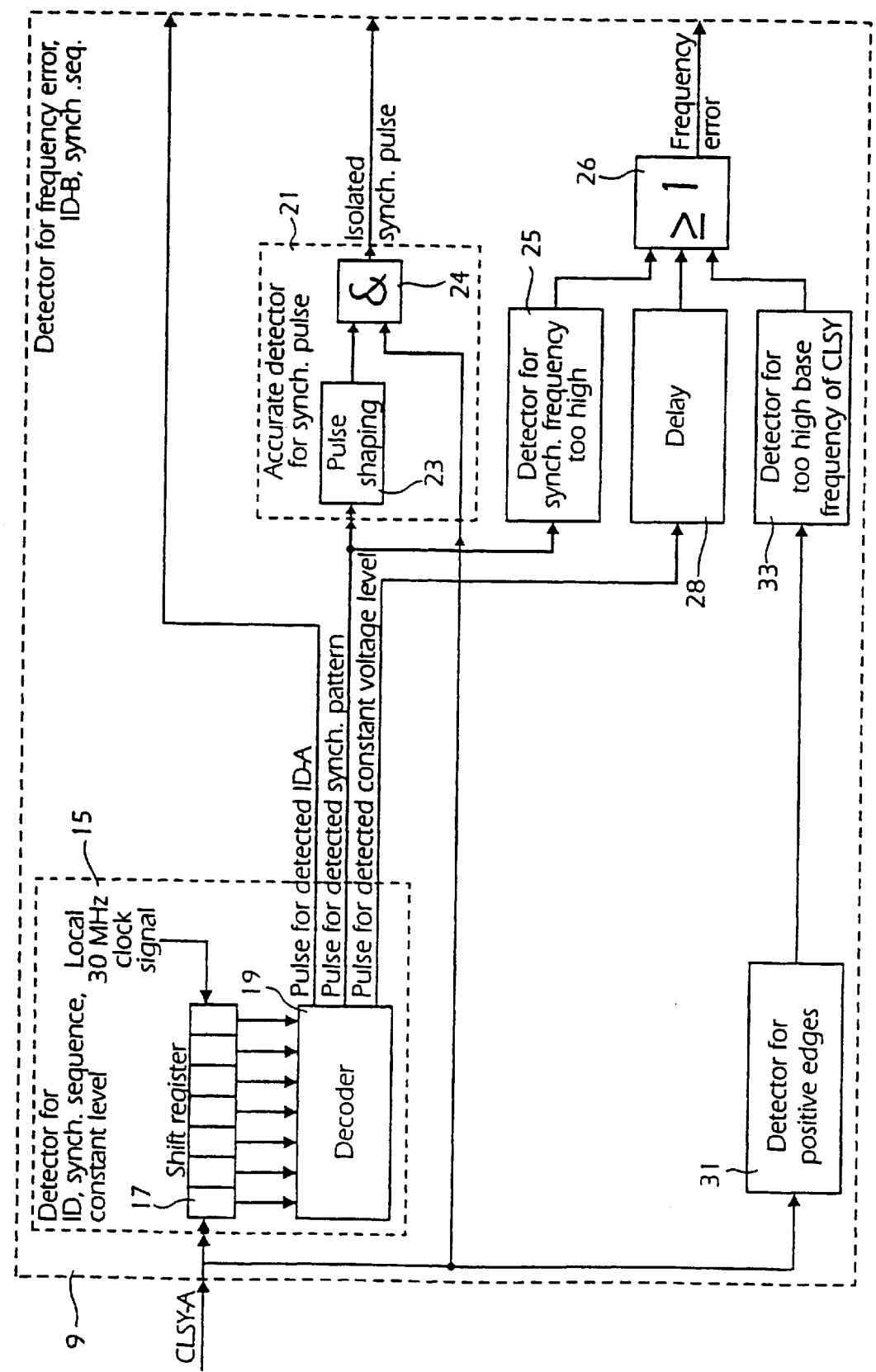
FIG. 5a is a block diagram of a frequency error detector.

The structure of the combined detector 9 for synch pattern, frequency error and ID-codes is illustrated in the block diagram of FIG. 5*a*. Its main portion is a detector 15 that provides a pulse having a standardized length each time that an identity sequence is encountered or detected in the arriving signal, a similar pulse each time that a synchronizing pulse sequence is detected and further an error signal in the shape of a similar pulse, in the case where the arriving signal has a constant level during a sufficiently long time period. The detector 15 is thus to detect those signal sections i the CLSY-A signal, which in FIGS. 2 and 3 are designated S and ID-A, ID-B, ID-C, respectively. Further, the detector 15 also always provides a signal when the signal sections designated F and P are encountered, since as appears from FIG. 3, during these signal sections the composite clock signal is constant during periods following after each other by the omission of pulses and by the fact that the constant time length during which the state of constant voltage exists, is larger than a threshold value which here is chosen to correspond to five halfperiods of the base band frequency of the arriving composite clock signals. The detector 15 contains a shift register 17, to the input terminal of which one of the composite clock signals is communicated. The clocked shifting in the shift register is produced by means of a locally generated clock signal of 30 MHz (strictly 30.72 MHz). The different positions in the shift register 17 are connected to a decoder 19 which delivers the desired signals on its output terminals.

The combined detector 9 also comprises a detector 21 for an accurate detection of the synchronization patterns in the arriving composite clock signal, compare also the wave form diagrams in FIGS. 5*b*–5*e*. Exactly that pulse in the arriving signal, see FIG. 5*b*, that comes after a detected synch pattern, is forwarded from this detector. For achieving this, first the pulse provided by the detector 15 when it detects a synch pattern is utilized and this pulse has a resolution of 30 MHz, see FIG. 5*c*. This short pulse is fed to a pulse shaping circuit 22 that also has a suitably adapted delay. The signal provided from the pulse shaping circuit 23 will then get an appropriate length and a time position so that it always covers the pulse following immediately afterwards in the base band signal of 5 MHz in the arriving composite clock signal, see FIG. 5d. Then this longer signal is fed to an AND-gate 24, to the other input of which the composite clock signal CLSY-A is communicated and the an output pulse is obtained from the AND-gate as illustrated in the diagram of FIG. 5e.

Further, in the combined detector 9 a detector 25 is provided for determining whether the frequency of the synchronization pattern is too high or equivalently whether the time period between two synchronization patterns is too short. For this comparison a local clock source is used having for example a frequency of 120 kHz. A signal is provided from the detector 25 in the case where the frequency of the synchronization pattern is decided to be too high and this signal is delivered to an OR-gate 26. On the output terminal of the OR-gate 26 a signal is provided indicating that some sort of frequency error has been detected.

The signal generated in the main detector 15 for indicating that the arriving signal has been detected to be constant during a time period is communicated to a delay circuit 28, the function of which has been described above. The delayed error signal is also forwarded to an input of the OR-gate 26.

The composite signal arriving to the combined detector 9 is also communicated to a detector 31 that provides a pulse each time that a positive edge or a positive transition exisis in the arriving composite clock signal. This is achieved by sampling the arriving CLSY signal by means of a high frequency of 184 MHz that is derived from a local clock source. The rising transitions detected in the sampling are converted to pulses that are used in the following detector 33. It evaluates the frequency of the incoming pulses and provides a signal in the case where the determined frequency is too high. The provided signal is also communicated to the OR-gate 26.

Figure 6A:
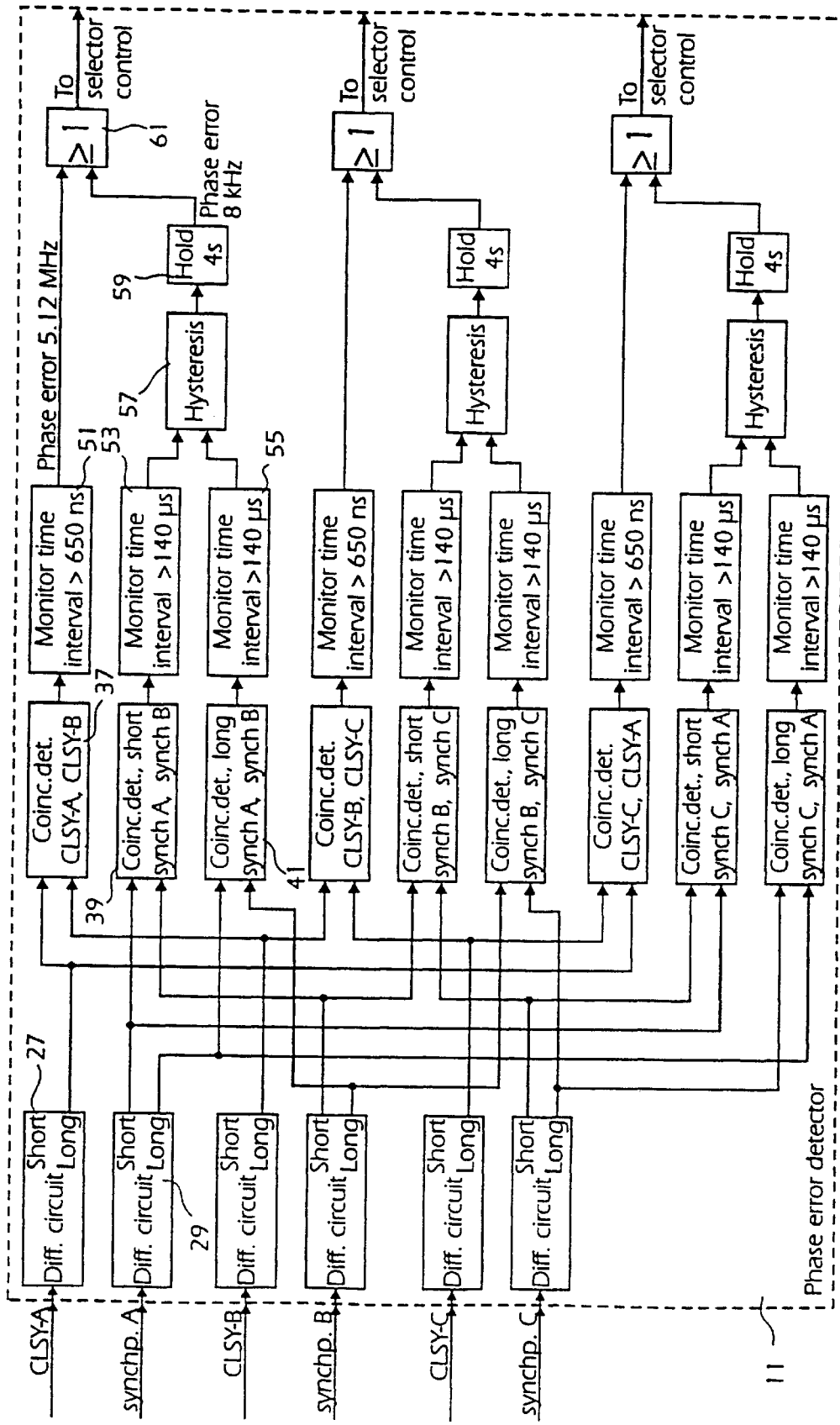
FIG. 6a is a block diagram of a phase error detector.

In FIG. 6a the construction of the phase detector 11 is illustrated. Thereto arrive both the composite clock signals CLSY-A, CLSY-B, CLSY-C and the individual pulse that has been isolated from the corresponding composite clock signals and comes immediately after the synchronization section in the signal, as has been described above, here denoted synchp. A, synchp. B and synchp. C, respectively. Each one of these signals is delivered to differentiating circuits 27 and 29, respectively. These differentiating circuits are each one built of a shift register 31', see FIG. 6b, which is clocked by means of the internal, locally generated frequency of 184 MHz, in the same way as has been mentioned for some units above. The shift register 31' has a size of 10 bits. The ninth and tenth positions in the shift register 31' is connected to inverting inputs of two AND-gates 33' and 35, respectively, so that on the output terminals of these gates output pulses are obtained that have different lengths. In FIG. 6c the incoming signal is illustrated as a wave form as a function of time. It continues to a high logical level at a definite time. The output signal from the first AND-gate 33' is illustrated in the corresponding way in FIG. 6d and comprises a pulse, called the short pulse or diff_short, that has a length of eight to nine periods UI (unity intervals) of the local frequency of 184 MHz (strictly 184.32 MHz). The output signal from the other AND-gate 35 is illustrated in the corresponding way in FIG. 6e and comprises a longer pulse, called the long pulse or diff_long, that has a length of nine to ten such periods. The uncertainty of the lengths is illustrated by the shaded fields at 36 and depends on the discrete nature of the local pulse signal having the frequency 184 MHz and its phase position in relation to the input signal in FIG. 6c. However, the long pulse is always exactly one period length longer than the short pulse. The start of the obtained pulses will be accurately determined by the arriving signal, the end, the decreasing edge, is related to the corresponding transitions in the locally generated clock signal having the frequency of 184 MHz.

From the differentiating units 27 for the clock signals only the long differentiation pulse is delivered and these pulses from two differentiation units are fed in pairs to a coincidence, detector 37. Three identical such coincidence detectors 37 are then arranged. A coincidence detector 37 consists of, see FIG. 6f, an AND-gate 43 and suitable pulse shaping and pulse is delaying circuits 45 connected to the output thereof. When the two input signals In1 and In2 have pulses that overlap, from the detector 37 an output pulse is obtained that has always the length 7 UI as taken in relation to the locally generated clock signal of the high frequency of 184 MHz and that always has a definite phase position in relation thereto. Further, always the time interval between the start of the output pulse and the start of the first arriving pulse comprises a definite number of whole periods (of length UI) of the locally generated clock signal of 184 MHz and in addition thereto possibly a shorter time interval that is shorter than such a period.

Wave forms for the processing of the long pulses from differentiation units 27 in a coincidence detector 37 are illustrated in FIGS. 6g–6i. Here first is illustrated at the top of FIGS. 6g–6i, as a function of time, the locally generated pulse signal of 184 MHz. Thereunder the two arriving signal In1 and In2 are shown the coincidence of which is to be determined. Thereunder is shown the output signal from the AND-gate. At the bottom the wave form of the finally provided signal Out is illustrated. In FIG. 6g the pulses of the input signals have a rather large overlap, more than 6 UI, the overlap in FIG. 6h only being a fraction of 1 UI. In FIG. 6i no overlap exists at all between the input pulses and then naturally no output pulse is obtained.

The same type of coincidence detectors are arranged for the signals as taken in pairs in regard of the differentiated synchronization pulses, both coincidence detectors 39 for the short pulses and coincidence detectors 41 for the long generated pulses.

The signals from the coincidence detectors 37, 39, 41, the pulses of which have a length of seven periods of the locally generated clock signal of 184 MHz, are communicated to monitoring circuits or detectors 51, 53 and 55 respectively, that provide a signal in the case where the arriving pulses have a too great time interval therebetween. These time intervals are, for the base frequency of the composite clock signal, set to 650 nanoseconds but for the synchronization signal the threshold value is 140 microseconds to be compared to the intended period thereof comprising 125 microseconds.

The threshold value of 650 nanoseconds for the base frequency in the composite clock signal is set so that a frequency reject sequence that has a length of five halfcycles in the signal of 5.12 MHz is not detected as a phase error but a phase reject sequence comprising seven halfcycles of the base band frequency of 5.12 MHz in the arriving clock signal triggers a phase alarm and a signal is delivered from the detector 51. Five halfcycles of the base band frequency 5.12 MHz correspond to a time length of 480 nanoseconds and seven halfcycles correspond to 683 nanoseconds.

Coincidence of the synchronization signals is detected in the interval monitoring circuits 53 and 55, respectively, for the two differentiation pulses having different lengths. From these monitoring circuits 53 and 55 respectively output pulses are provided in the case where the interval between two of these pulses exceeds 140 microseconds.

Figure 6J:
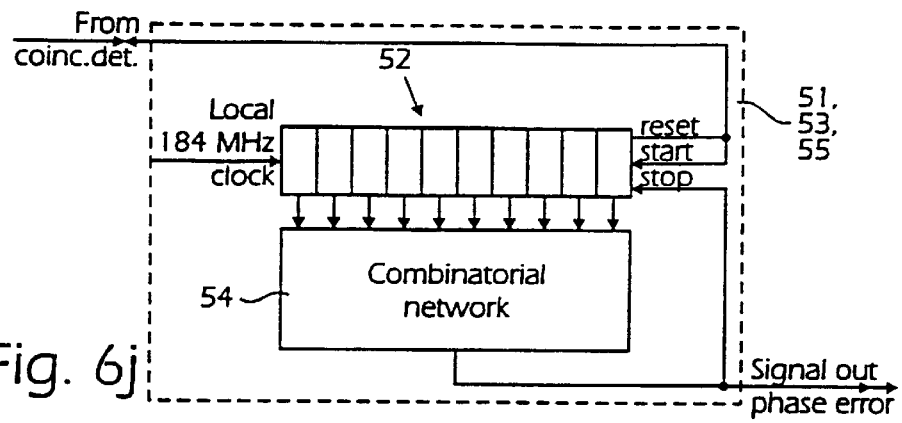
FIG. 6j is a block diagram of a time interval monitoring unit used in the phase error detector.

The construction of an interval monitoring circuit 51, 53, 55 can be as is illustrated in FIG. 6j. A counter 52 is clocked by a locally generated clock signal of for example 184 MHz. The contents of the counter 52 are compared to a threshold value by means of a combinatorial network 54. It provides the output signal of the circuit when the threshold value is achieved and then also the incrementing of the counter 52 is stopped. It is reset and started when being supplied with a signal from a coincidence detector.

The output pulses from each pair of detector circuits 53, 55, that are connected to receive the same pair of incoming signals (synchp. A, synchp. B, synchp. C) are delivered to a hysteresis circuit 57 that ensures that a phase error signal of the synch pattern is not generated too often when the phase error is within the magnitude of the threshold value, what otherwise would give unnecessarily frequent phase error signals. This depends on the fact that the phase of the locally generated clock signal of 184 MHz naturally has no fixed phase-relation to the phase of the two incoming clock signals, for which a possible phase error is to be detected. As can be determined from wave form diagrams according to FIGS. 6g and 6h short pulses having lengths of 8–9 UI from the differentiation circuits can in the worst case give output signals that indicate coincidence in the case where the starts of the pulses are separated by a little less than 9 UI and an output signal that indicates a lack of coincidence, i.e. no output pulse and thus a phase error, in the case where the leading edges of the short pulses are separated by somewhat more than 8 UI. The corresponding condition applies to the long pulses having lengths of 9–10 UI, where all time periods are increased by 1 UI.

Assume for example that CLSY-A and CLSY-B have a phase difference between each other comprising 1 UI and that CLSY-C has a phase difference of 8.5 UI in relation to CLSY-A and 9.5 UI in relation to CLSY-B. In this case CLSY-C can be interpreted both as in phase or out of phase compared to the two other clock signals. First, if CLSY-C is determined to be in phase, the clock selector will change cyclically between all the three clock signals, what all the time gives a certain average phase in the selected delivered clock signal as an input signal of the PLL 5. After some time period, when the PLL has changed its output phase in relation to the locally generated clock signal of 184 MHz, CLSY-C will however be determined to be out of phase in relation to the other two clock signals. Then the clock selector will instead select alternatingly CLSY-A and CLSY-B providing another value of the average phase to the PLL 5 which then will start oscillating towards the new average phase value in the delivered clock signal. After a further time period CLSY-C will again be judged to be in phase with the two other clock signals. This results in jitter that can be removed by generating both long and short pulses, the length difference always being 1 UI, and by providing the hysteresis function.

Figure 6K:
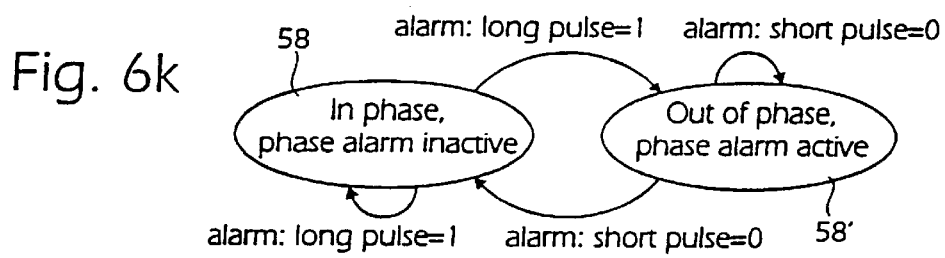
FIG. 6k is a state diagram of a hysteresis circuit used in the phase error detector.

A state diagram of a hysteresis circuit is shown in FIG. 6k. It contains two states, a first state 58, which state the machine normally takes when the considered signals are in phase with each other, and a second state 58' which is taken when signals have a phase error. In the second state 58' an alarm signal is provided from the circuit. The state machine passes from the first state to the second state only when it receives a pulse that originally is derived from long pulses, generated by differentiation circuits 29, which pulses have later been processed by a coincidence circuit and an interval monitoring circuit. Then also naturally always pulses are received simultaneously which originate from short pulses. In the same way the state machine passes from the second state to the first state only when it receives pulses that originally come from short pulses, generated by the differentiation circuits 29.

Figure 6L:
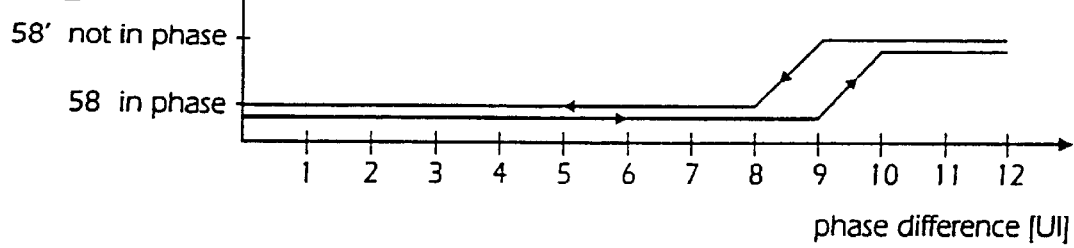
FIG. 6l is a time diagram illustrating the states of the hysteresis circuit.

In FIG. 6l a diagram is shown illustrating the hysteresis function. On the abscissa axis the phase difference of the clock signals is plotted in the unit UI (=unit interval of the local clock signal) and on the ordinate axis the two states 58, 58' of the state machine. Thus, when the phase difference has become a little greater than 9–10 UI, where the uncertainty depends on quantization owing to the local clock signal, a transition is made to the second state, a transition therefrom only being possible when the phase difference has become a little less than 8–9 UI.

Figure 6N:
FIGS. 6n and 6o are wave form diagrams illustrating the function of a hold circuit.
Figure 6O:
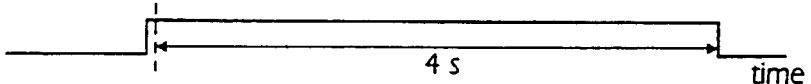

The signal from the hysteresis circuit 57 is delivered to a hold circuit 59, which holds, when it receives a pulse from the hysteresis circuit 57, that indicates a too long period or time interval between coincidence pulses, this pulse during a time period of 4 seconds and thus on its output terminal provides a pulse having a length of at least 4 seconds. This is illustrated by the wave form diagram of FIGS. 6n–6o, where in FIG. 6n a pulse is shown arriving to the hold circuit 59 and in FIG. 6o that pulse is illustrated that is provided by the hold circuit and has a guaranteed length of 4 seconds.

Finally, the error signal from the hold circuit 59 is provided to an OR-circuit 61, to the other input terminal of which that signal is fed that indicates whether a too long period exists in the base frequency of the composite arriving signal. The signals from the OR-circuits 61 are then supplied to the clock selector control circuit 7.

Figure 6M:
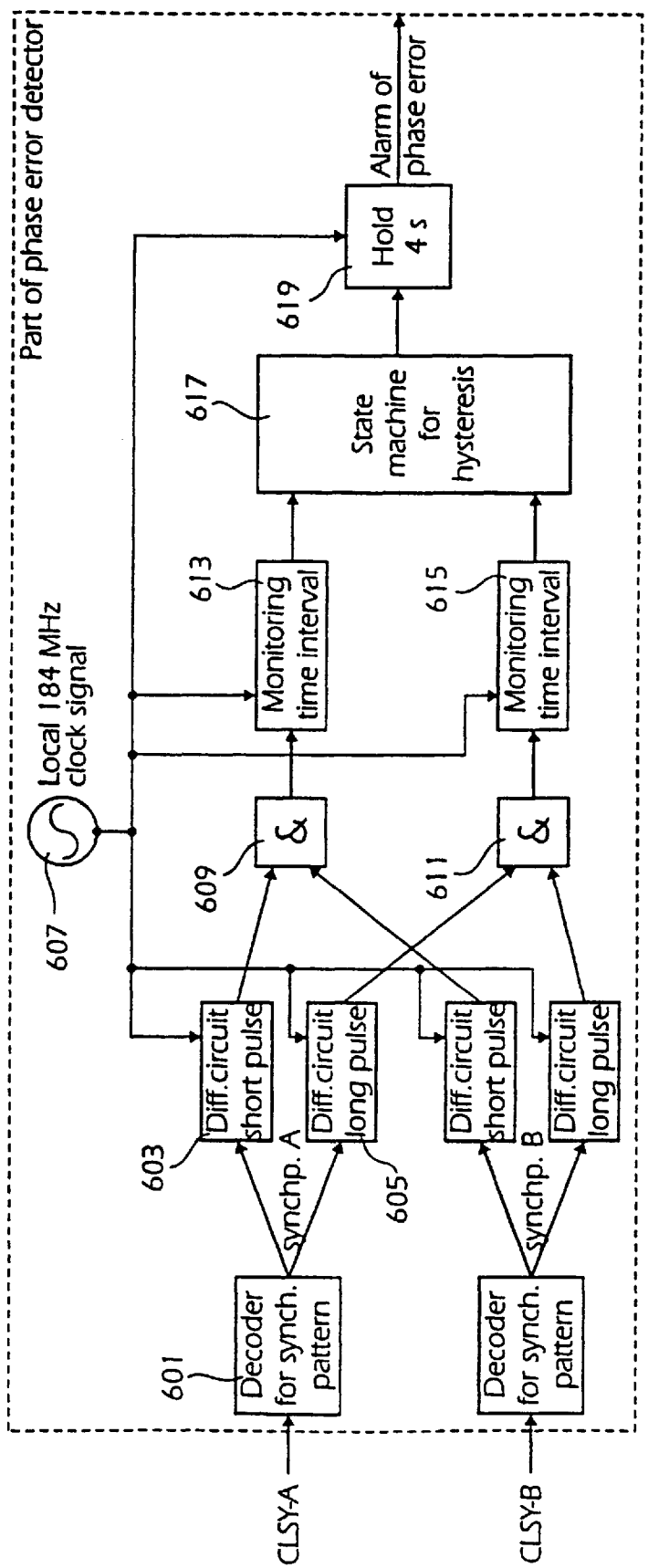
FIG. 6m is a block diagram illustrating how phase errors are monitored.

The circuits for determining phase errors of the synch patterns in two composite clock signals CLSY-A and CLSY-B in relation to each other are illustrated in FIG. 6m. These clock signals are fed to an individual decoder 601 for each clock signal that corresponds to circuits in the block 15 above. Therefrom the retrieved synch pulse is provided and from each decoder 601 it is delivered both to a differentiation circuit 603 for short pulses and to a differentiation circuit 605 for long pulses. The differentiation circuits correspond to the differentiation circuit 29 above and they are clocked by the same clock signal having a high frequency from a local oscillator 607. They thus supply differentiation pulses, the lengths of which always have a difference of one period of the locally generated clock signal. The pulses from the differentiation circuits 603 for short pulses are delivered to a first coincidence detector in the shape of an AND-gate 605 that corresponds to the detector 35 described above. In the corresponding way the pulses from the differentiation circuits 605 for long pulses are fed to a second coincidence detector, an AND-gate 611 corresponding to the detector 41, see FIG. 6a. The signals from the AND-gates 609 and 611 are fed to time interval monitoring units 613 and 615, respectively, which correspond to the monitoring, circuits 53 and 55 as described above. Finally, the signals from the monitoring units 613 and 615 are supplied to a hysteresis unit 617, which corresponds to the previously described hysteresis machine 57, and therefrom the signal is supplied to a hold circuit 619 that corresponds to the circuit 59 according to the above and delivers a pulse which is held or maintained 4 seconds as soon as it receives a pulse having a high logical level on its input terminal. This pulse is also the output signal from the whole circuit and indicates that a phase error exists of the synch patterns of the supplied signals CLSY-A and CLSY-B in relation to each other.

It can be observed that a detector structure according to the above for providing a signal in the case where there exists a too large phase difference will also output a permanent error signal when a small frequency error exists in the synch patterns in the arriving signals in relation to each other. Thus, if a small frequency difference exists in the arriving error signals, for example of the magnitude of order of 1 ppm or less, it will become apparent in the shape of the fact that the phase between the two synch signals varies and at some times is smaller than the threshold limit for detection of phase errors and at times is greater than the threshold limit, i.e. a signal indicating a phase error will be generated periodically. By introducing the hold circuit 619 and 59, respectively, frequency errors that generate such periodically repeated phase error signals will be detected as a constant phase error in the case where the period during which no error signal is generated is less than the hold time in tile circuits 617 and 619, respectively. For the frequencies and times as indicated above it would correspond to the case that frequency errors larger than about 0.01 ppm are detected.

Figure 7A:
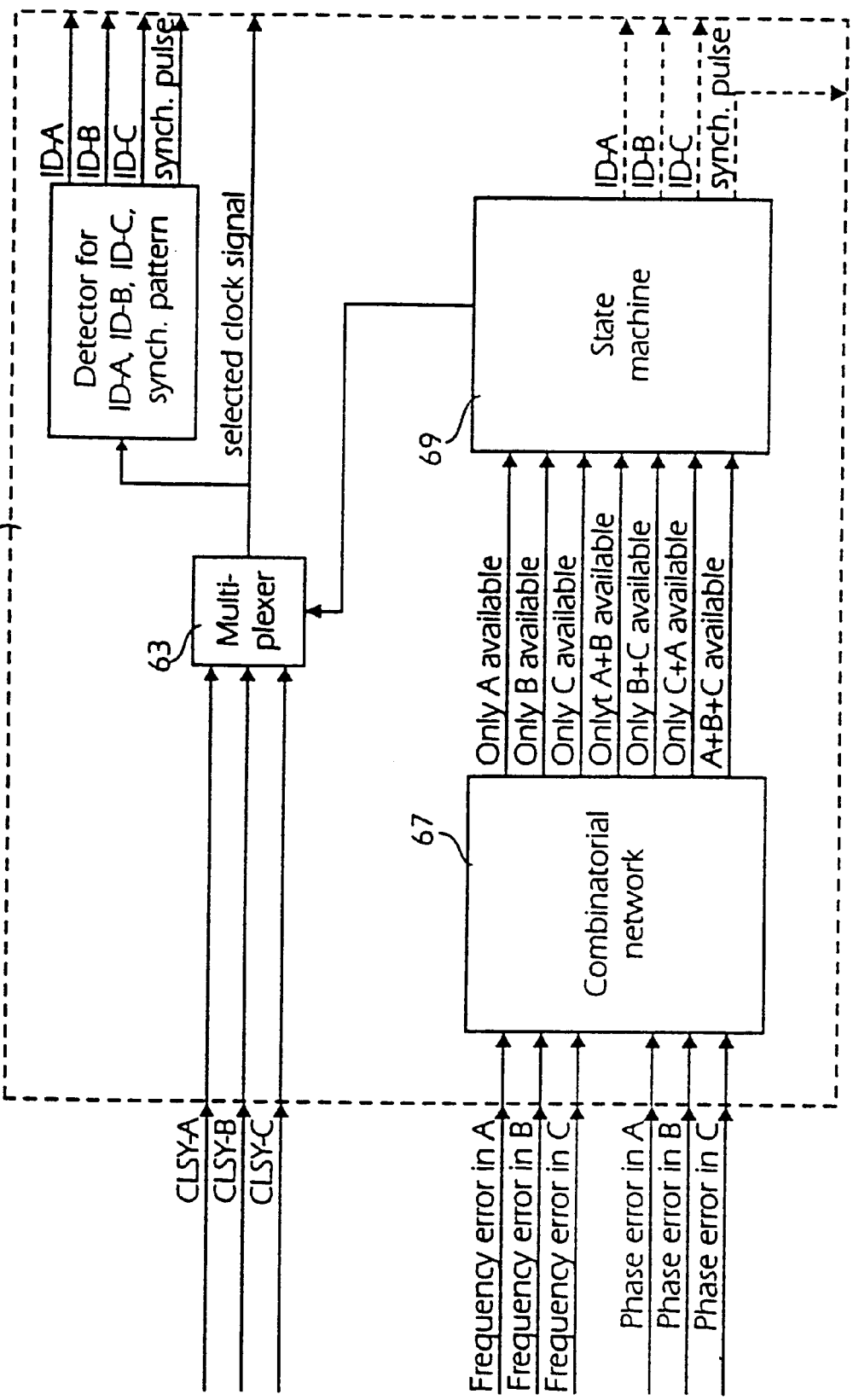
FIG. 7a is a block diagram of a clock selector control.

The clock selector control 7 is shown in FIG. 7a. The composite clock signals CLSY-A, CLSY-B and CLSY-C are fed to a multiplexer 63. The frequency error signals of the composite signals CLSY-A, CLSY-B and CLSY-C are fed to a combinatorial network 67, which also receives the corresponding phase error signals of the composite clock signals. The combinatorial network 67 provides signals on its output terminal indicating that only the clock signal A or B or C is available, that only both A and B are available, that only both B and C are available, that only both C and A are available and finally that all three signals A and B and C are available. The truth table of the combinatorial network is shown in FIG. 7b.

Figure 7C:
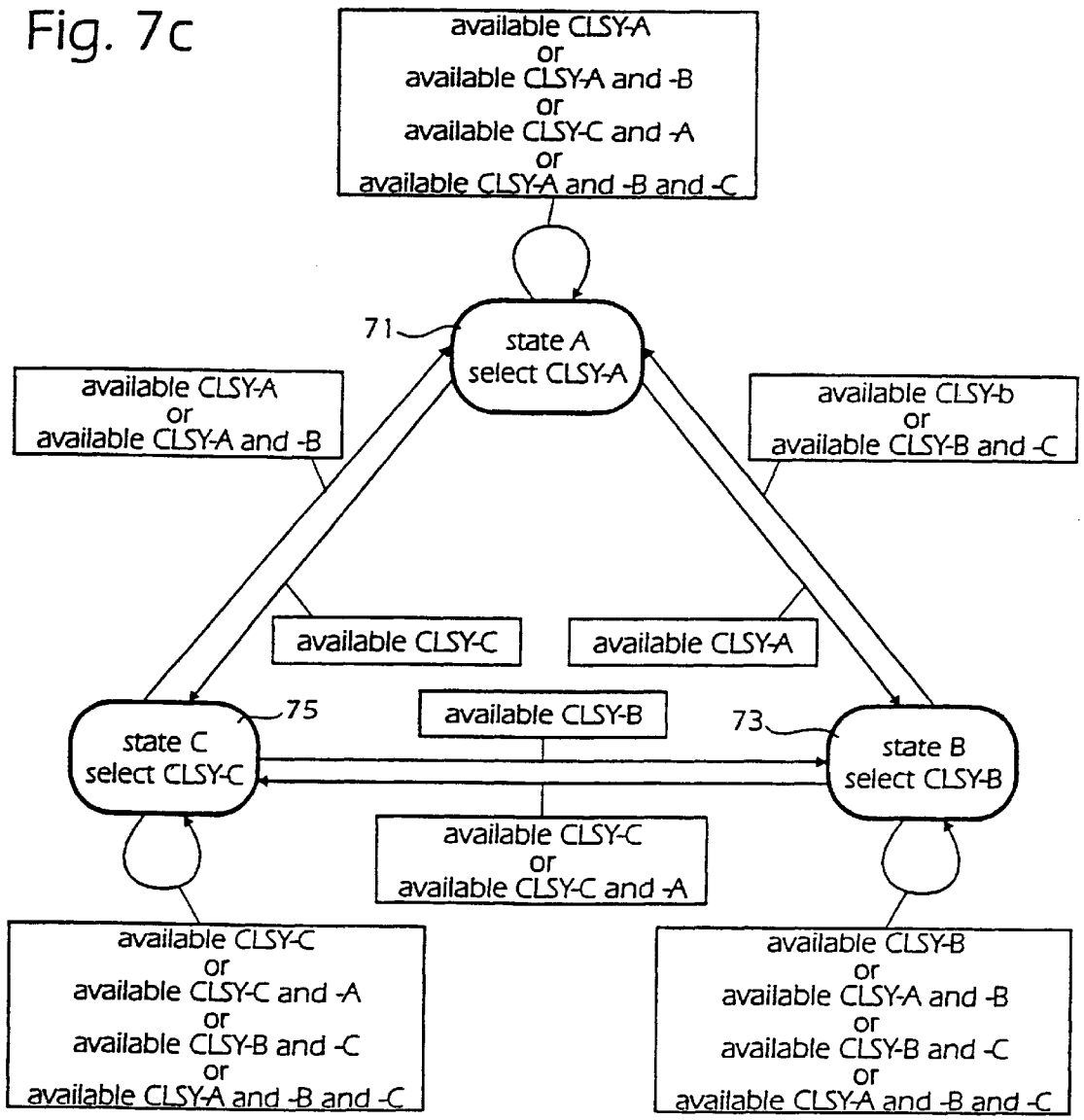
FIG. 7c is a state diagram of a state machine used in the clock selector control.

The availability signals are fed to a state machine 69 controlling the multiplexer 63 according to a programmed control scheme. This control scheme is illustrated by the state diagram of FIG. 7c. Three states 71, 73 and 75 are provided, one for each one of the three composite clock signals CLSY-A, CLSY-B, CLSY-C, in which exactly this clock signal is the selected signal, that signal which is to be provided from all of the clock selector 3 and in particular from the clock selector control 7. The machine passes from the state 71, CLSY-A. selected, to the state 73, CLSY-B selected, in the case where some of the signals "only CLSY-B available" or "only CLSY-B and CLSY-C available" exist. The machine passes from the state 71, CLSY-A selected, to the state 75, CLSY-C selected, in the case where the signal "only CLSY-C available" exists. The machine passes from the state 73, CLSY-B selected, to the state 75, CLSY-C selected, in the case where some of the signals "only CLSY-C available" or "only CLSY-C and CLSY-A available" exist. The machine passes from the state 73, CLSY-B selected, to the state 71, CLSY-A selected, in the case where the signal "only CLSY-A available" exists. The machine passes from the state 75, CLSY-C selected, to the state 71, CLSY-A selected, in the case where some of the signals "only CLSY-A available" or "only CLSY-A and CLSY-B available" exist. The machine passes from the state 75, CLSY-C selected, to the state 73, CLSY-B selected, in the case where the signal "only CLSY-B available" exists.

The composite clock signal selected by the multiplexer 63 is then supplied to the corresponding phase-locked loop circuit for retrieving system bit clock and synch rate, which are then distributed for use in the respective plane, and also to a regenerator 6, see FIG. 1, in the case where further cascaded units are provided. From the selected clock signal, in a detector circuit 77, also possible encountered ID-codes and synch patterns are extracted for supplying count pulses each time that they are encountered for incrementing the count registers 14 and 67, respectively, see FIG. 4, in order to be processed by the monitoring unit 12.

Alternatively, count pulses corresponding to the ID-code that is valid for the clock signal selected at the considered time, could be supplied directly by the state machine 69, as is indicated by dotted lines, and also a count pulse corresponding to the arriving synchronization pulse for updating the counters.

Figure 8:
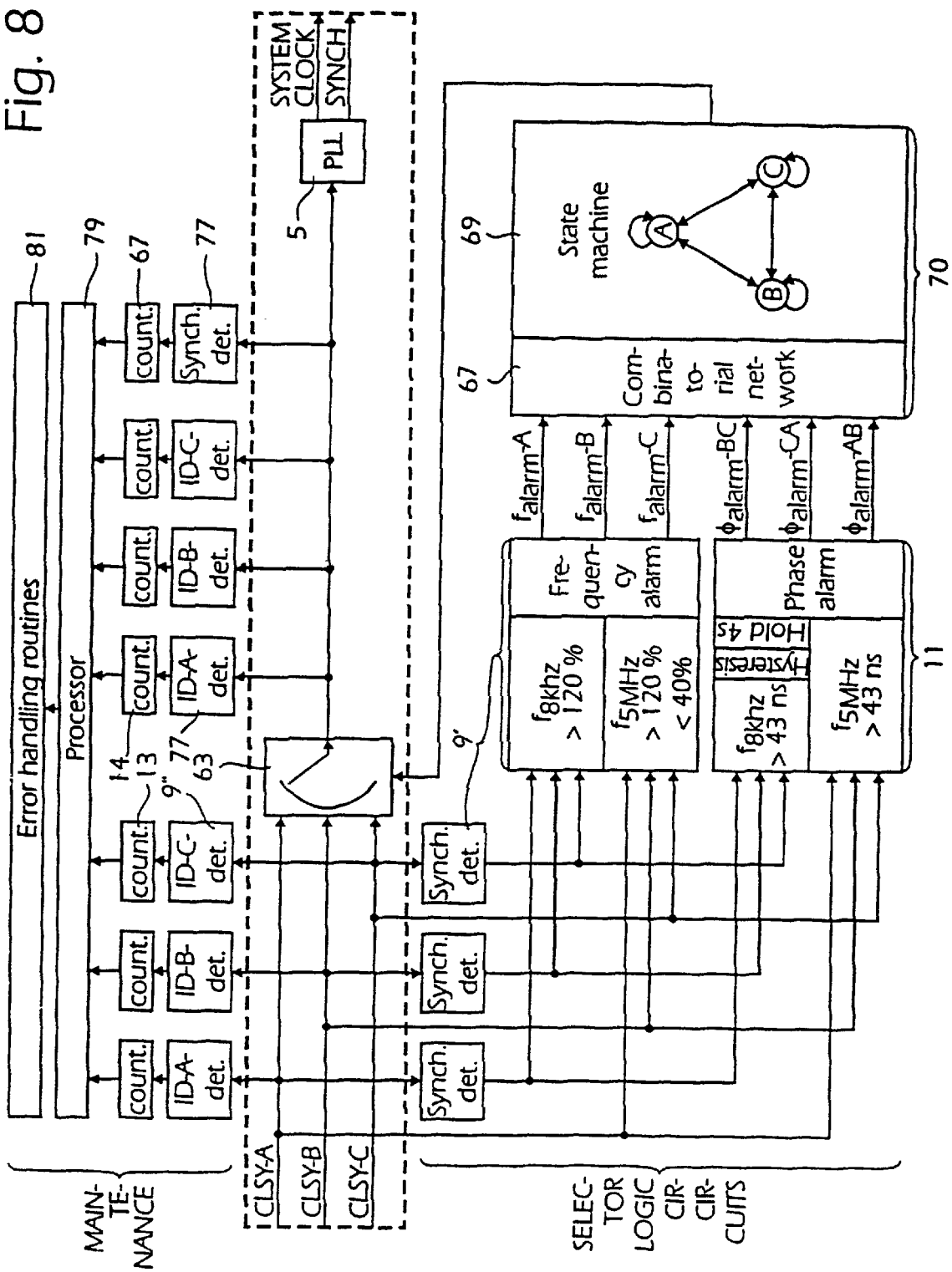
FIG. 8 is a schematic block diagram of a unit for selecting a clock signal and for producing a system clock and a synch rate.

In FIG. 8 a schematic picture of a plane in a subsystem is illustrated that schematically shows several of the components discussed above. The composite clock signals CLSY-A, CLSY-B and CLSY-C thus arrive to the multiplexer or switch 63, which is controlled by signals from the state machine 69 and normally all the time provides as an output signal, i.e. a selected signal, a clock signal that changes between the arriving clock signals at approximately regularly repeated times, in a cyclic schematic such as . . . CLSY-A→CLSY-B→CLSY-C→CLSY-A→CLSY-B→CLSY-C→.

The state machine 69 is here illustrated as incorporated in a control unit 70, which in addition to the state machine includes the combinatorial network 67. The control unit 70 receives as input signals the alarm signals, which thus are related to frequency error in clock signal A, frequency error in B, frequency error in C, phase error in A, phase error in 13, phase error in C, both from the synch pattern, frequency error and ID-detectors 9 and from the phase error detectors 11. The combined detectors 9 first mentioned are here illustrated as divided into blocks 9', 9", where the former ones supply the frequency error signals and the latter ones deliver a signal for detected, preselected ID-code, for incrementing the registers 13 for the number of received ID-pulses. The input signals to the control unit 70 determine transitions between different states in the state machine 69 through the combinatorial network 67. Also in the composite signal selected by the switch 63 the ID-pulses are determined by means of the synch pattern and ID-detector 77 for incrementing the registers 14. This detector also supplies a signal for incrementing the register 67 containing a stored value that indicates the number of received or detected synch patterns. The selected clock signal is also delivered to the phase-locked loop circuit PLL 5 for retrieving a system bit clock and synch pulses.

Here also a control and monitoring unit 79 is illustrated in the shape of a processor that is controlled by a program stored in memory means 81. The control and monitoring unit 7" monitors, at periodically repeated occasions, the values which at these instances are stored in the different registers 13, 14, 67, in order to determine whether these values are as they can be expected to be and to deliver an alarm signal to some superior unit or operator in the case where the values are not the expected ones.

What is claimed is:

1. A method of supplying a clock signal to subsystems in an electronic system, comprising the steps of:

generating, by different clock sources, at least two clock signals containing substantially the same timing information;

supplying the at least two clock signals on different independent lines as clock signals arriving to a first one of the subsystems; and periodically selecting, in the first one of the subsystems, one clock signal from among the arriving clock signals, wherein the selected clock signal periodically changes to a new selected clock signal from among the arriving clock signals if at least two arriving clock signals exist from which the selection can be made;

whereby the first one of the subsystems obtains a time average of phase positions of the arriving clock signals over a time period that includes a plurality of changes of the periodically selected clock signal.

2. The method of claim 1, wherein the selected clock signal cyclically changes among arriving correct clock signals.

3. The method of claim 1, further comprising the step of providing the selected clock signal to a phase-locked loop for producing a second clock signal, wherein the selected clock signal periodically changes to a new selected clock signal so often that a phase position of the second clock signal is substantially free from jitter.

4. The method of claim 3, wherein the phase-locked loop has a time constant such that, for a selection of a new clock signal, the phase-locked loop has time only to adapt to a limited extent to the phase position of the new clock signal.

5. The method of claim 1, wherein the first one of the subsystems evaluates the arriving clock signals for determining those arriving clock signals that are correct, and the periodically selected one clock signal is selected from among only those clock signals determined to be correct.

6. The method of claim 5, further comprising the step of entering intentional errors in the arriving clock signals, the errors being entered such that in evaluating the arriving clock signals, the first one of the subsystems determines that an arriving clock signal is incorrect and based thereon a new clock signal is selected from among the arriving clock signals, whereby the selected clock signal periodically changes to a new selected clock signal.

7. The method of claim 1, further comprising the step, in the first one of subsystems, of evaluating the arriving clock signals, wherein at least two clock signals are periodically selected from among the arriving clock signals by at least two different processes working independently and in parallel of each other.

8. The method of claim 7, wherein the number of different processes is the number of lines on which clock signals arrive to the first one of the subsystems.

9. The method of claim 8, wherein the first one of the subsystems includes the number of different selector units, and the clock signals are selected by at least two different selector units working independently of each other and performing different independent processes for producing selected clock signals.

10. The method of claim 7, further comprising the steps of including the at least two independently periodically selected clock signals, each on its own line, among the clock signals arriving at a second one of the subsystems, and periodically selecting, in the second one of the subsystems, one clock signal from among the arriving clock signals in substantially the same way as in the first one of the subsystems.

11. A network for processing information, for performing processes in different stations, and for forwarding information between stations, in which a clock signal is used for control, comprising:

at least two clock sources, the clock sources generating clock signals containing substantially the same timing information;

a first subsystem;

different independent communication channels from each clock source to the first subsystem for supplying the clock signals as clock signals arriving thereto; and a selector in the first subsystem that periodically selects a clock signal from among the arriving clock signals;

wherein the selector in the first subsystem periodically selects the clock signal such that the selected clock signal periodically changes to a new selected clock signal if at least two arriving clock signals exist from which the selection can be made;

whereby in the first subsystem a time average of phase positions of the arriving clock signals is obtained over a time period that includes a plurality of changes of the periodically selected clock signal.

12. The network of claim 11, wherein the selected clock signal cyclically changes among arriving clock signals.

13. The network of claim 11, further comprising a phase-locked loop, to which the periodically selected clock signal is provided by the selector, and which is arranged to produce a second clock signal, wherein the periodically selected clock signal changes so often and the phase-locked loop is so arranged that a phase position of the second clock signal is substantially free from jitter.

14. The network of claim 13, wherein the phase-locked loop has a time constant such that, for a selection of a new clock signal, the phase-locked loop has time only to adapt to a limited extent to the phase position of the new clock signal.

15. The network of claim 11, further comprising comparison and evaluation means in the first subsystem for comparing and evaluating the arriving clock signals for determining those of the arriving clock signals that are correct, wherein the selector is connected to the comparison and evaluation means and selects a new clock signal from among only those arriving clock signals determined to be correct.

16. The network of claim 15, further comprising means for entering in the clock signals intentional errors that are determinable by the comparison and evaluation means, wherein based on determination of an error, the selector in the first subsystem selects a new clock signal, whereby the selected clock signal periodically changes to a new selected clock signal.

17. The network of claim 15, wherein the comparison and evaluation means in the first subsystem includes at least two units working independently of and in parallel with each other.

18. The network of claim 17, wherein the number of units working independently of and in parallel with each other is the number of clock signals arriving at the first subsystem.

19. The network of claim 15, wherein the selector in the first subsystem includes a plurality of selector units working independently of each other and receiving the clock signals arriving at the first subsystem, and each selector unit selects, independently of and in parallel to other selectors units, a clock signal from among the arriving clock signals, whereby a plurality of selected clock signals are obtained in parallel.

20. The network of claim 19, wherein the number of selector units working independently of and in parallel with each other is the number of clock signals arriving at the first subsystem.

21. The network of claim 19, further comprising a second subsystem having a second selector that is substantially identical to the selector in the first subsystem, and different independent communication channels from the selector units included in the selector in the first subsystem for supply respective ones of the plurality of selected clock signals as clock signals arriving at the second subsystem.

* * * * *